US012156200B2

(12) United States Patent  
Asterjadhi et al.

(10) Patent No.: US 12,156,200 B2
(45) Date of Patent: *Nov. 26, 2024

(54) QUALITY OF SERVICE (QoS) FOR UPLINK ACCESS IN A WIRELESS LOCAL AREA NETWORK (WLAN)

(71) Applicant: QUALCOMM Incorporated, San Diego, CA (US)

(72) Inventors: Alfred Asterjadhi, San Diego, CA (US); Abhishek Pramod Patil, San Diego, CA (US); Lochan Verma, Danville, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,787

(22) Filed: Mar. 14, 2023

(65) Prior Publication Data

US 2023/0337227 A1 Oct. 19, 2023

Related U.S. Application Data

(63) Continuation of application No. 16/514,878, filed on Jul. 17, 2019, now Pat. No. 11,638,280.

(Continued)

(51) Int. Cl.
*H04W 72/1268* (2023.01)
*H04W 28/02* (2009.01)

(Continued)

(52) U.S. Cl.
CPC ... *H04W 72/1268* (2013.01); *H04W 28/0268* (2013.01); *H04W 72/0446* (2013.01);
(Continued)

(58) Field of Classification Search
CPC ............ H04W 28/0268; H04W 28/18; H04W 72/0446; H04W 72/1236; H04W 72/1252;
(Continued)

(56) References Cited

U.S. PATENT DOCUMENTS 7,684,333 B1 * 3/2010 Dasylva ................ H04L 5/0064
370/468
11,638,280 B2 4/2023 Asterjadhi et al.
(Continued)

*Primary Examiner* — Khoa Huynh
(74) *Attorney, Agent, or Firm* — Holland & Hart LLP

(57) ABSTRACT

This disclosure provides systems, devices, apparatus and methods, including computer programs encoded on storage media, for managing uplink access in a wireless local area network. A station (STA) may inform an access point (AP) of uplink quality of service (QoS) parameters for a traffic flow from the STA. The AP may control uplink resources to satisfy the QoS parameters. For example, the AP may select from among different access modes (including a single user (SU) access mode, an uplink multi-user (UL-MU) scheduled access mode, a multi-user enhanced distributed controlled access (MU EDCA) access mode, or a low latency (LL) access mode). The AP may cause the STA to use a SU access mode or the LL access mode if the UL-MU scheduled access mode and the MU EDCA access mode are not sufficient to satisfy the uplink QoS parameters for the traffic flow.

30 Claims, 14 Drawing Sheets

Related U.S. Application Data

(60) Provisional application No. 62/702,287, filed on Jul. 23, 2018.

(51) Int. Cl.
*H04W 72/0446* (2023.01)
*H04W 72/52* (2023.01)
*H04W 72/543* (2023.01)
*H04W 84/12* (2009.01)

(52) U.S. Cl.
CPC ......... *H04W 72/52* (2023.01); *H04W 72/543* (2023.01); *H04W 84/12* (2013.01)

(58) Field of Classification Search
CPC ............. H04W 72/1268; H04W 72/52; H04W 72/543; H04W 74/006; H04W 74/02; H04W 84/12
See application file for complete search history.

(56) References Cited

U.S. PATENT DOCUMENTS

| | | | |
|---|---|---|---|
| 2006/0002383 A1* | 1/2006 | Jeong | H04L 12/12 370/360 |
| 2006/0211441 A1 | 9/2006 | Mese et al. | |
| 2007/0008902 A1 | 1/2007 | Yaramada et al. | |
| 2007/0097867 A1 | 5/2007 | Kneckt et al. | |
| 2010/0099449 A1* | 4/2010 | Borran | H04W 52/243 455/501 |
| 2010/0284380 A1 | 11/2010 | Banerjee et al. | |
| 2016/0088636 A1* | 3/2016 | Zhao | H04W 16/14 455/454 |
| 2017/0064496 A1* | 3/2017 | Tanasa | H04W 4/02 |
| 2017/0202015 A1* | 7/2017 | Li | H04W 74/02 |
| 2021/0075864 A1* | 3/2021 | Sun | H04L 67/14 |

* cited by examiner

QUALITY OF SERVICE (QoS) FOR UPLINK ACCESS IN A WIRELESS LOCAL AREA NETWORK (WLAN)

CROSS-REFERENCE TO RELATED APPLICATIONS

This Patent Application is a continuation of U.S. patent application Ser. No. 16/514,878 filed Jul. 17, 2019, entitled "QUALITY OF SERVICE (QOS) FOR UPLINK ACCESS IN A WIRELESS LOCAL AREA NETWORK (WLAN)," which claims priority to U.S. Provisional Patent Application No. 62/702,287 filed Jul. 23, 2018, entitled "QUALITY OF SERVICE (QOS) FOR UPLINK ACCESS IN A WIRELESS LOCAL AREA NETWORK (WLAN)," both of which are assigned to the assignee hereof. The disclosure of the prior Applications are considered part of and are incorporated by reference in this Patent Application.

TECHNICAL FIELD

This disclosure generally relates to the field of wireless communication, and more particularly to quality of service in a wireless local area network.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP and including one or more wirelessly connected STAs. A station (STA) may have a wireless connection (referred to as a wireless association, or just "association") when it has authenticated and established a wireless session with the AP. One or more STAs in the WLAN may utilize the shared wireless communication medium to communicate with the AP. The AP may have an opportunity to influence the distribution of resources available in the shared wireless communication medium.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by an access point (AP) of a wireless local area network (WLAN). The method may include receiving at least a first uplink quality of service (QoS) parameter from a first station (STA), selecting an uplink access mode based, at least in part, on the first uplink QoS parameter, and causing the first STA to use the selected uplink access mode for uplink wireless communications from the first STA to the AP to satisfy the first uplink QoS parameter.

Another innovative aspect of the subject matter described in this disclosure can be implemented in a wireless communication device. The wireless communication device may be configured for use in a AP of a WLAN. The wireless communication device may include at least one processor and at least one memory communicatively coupled with the at least one processor and storing processor-readable code that, when executed by the at least one processor, causes the wireless communication device to perform operations. The operations may include receiving at least a first uplink QoS parameter from a first STA, selecting an uplink access mode based, at least in part, on the first uplink QoS parameter, and causing the first STA to use the selected uplink access mode for uplink wireless communications from the first STA to the AP to satisfy the first uplink QoS parameter.

In some implementations, the uplink access mode includes at least one member selected from a group consisting of a single user (SU) access mode, an uplink multi-user (UL-MU) scheduled access mode, a multi-user enhanced distributed controlled access (MU EDCA) access mode, a low latency (LL) access mode, and combinations thereof.

In some implementations, the methods and wireless communication devices may be configured to determine whether the UL-MU scheduled access mode can be used to satisfy the first uplink QoS parameter, select the UL-MU scheduled access mode in response to a determination that the UL-MU scheduled access mode can be used to satisfy the first uplink QoS parameter, and allocate resources of the UL-MU scheduled access mode for the first STA to satisfy the first uplink QoS parameter.

In some implementations, the methods and wireless communication devices may be configured to transmit a quantity of trigger frames to the first STA over a duration of time to satisfy the first uplink QoS parameter.

In some implementations, the methods and wireless communication devices may be configured to transmit a plurality of trigger frames to the first STA, wherein the plurality of trigger frames are transmitted using a periodicity to satisfy the first uplink QoS parameter.

In some implementations, the methods and wireless communication devices may be configured to transmit one or more trigger frames that allocate a first amount of uplink resources to the first STA to satisfy the first uplink QoS parameter.

In some implementations, the methods and wireless communication devices may be configured to determine that the UL-MU scheduled access mode cannot satisfy the first uplink QoS parameter, select a contention-based uplink access mode in response to a determination that the UL-MU scheduled access mode cannot satisfy the first uplink QoS parameter, wherein the contention-based uplink access mode includes one of the SU access mode, the MU EDCA access mode, or the LL access mode, and cause the first STA to use the contention-based uplink access mode.

In some implementations, the methods and wireless communication devices may be configured to indicate one or more contention windows in a message to the first STA to cause the first STA to contend for uplink access during the one or more contention windows.

In some implementations, the methods and wireless communication devices may be configured to modify a quantity of the one or more contention windows to be indicated to the first STA such that the quantity of the one or more contention windows is sufficient to satisfy the first uplink QoS parameter.

In some implementations, the methods and wireless communication devices may be configured to modify a contention parameter for a LL access category of the LL access mode, the contention parameter determined by the first AP based, at least in part, on the first uplink QoS parameter, and transmit an indication to the first STA to cause the first STA to use the LL access category of the LL access mode.

In some implementations, the methods and wireless communication devices may be configured to select the combination of the UL-MU scheduled access mode and MU EDCA access mode, allocate resources of the UL-MU scheduled access mode for a first portion of the uplink access for the first STA, and cause the first STA to use the MU EDCA access mode for a second portion of the uplink access.

In some implementations, the first STA is configured to use a multi-user (MU) association for use with a UL-MU scheduled access mode. In some implementations, the methods and wireless communication devices may be configured to determine that the UL-MU scheduled access mode cannot satisfy the first uplink QoS parameter and that a single-user (SU) association can satisfy the first uplink QoS parameter, and cause the first STA to use the SU association with a SU access mode for the uplink access rather than the MU association.

In some implementations, the methods and wireless communication devices may be configured to receive a second uplink QoS parameter from the first STA, and control the uplink access for uplink wireless communications from the first STA based, at least in part, on both the first uplink QoS parameter and the second QoS parameter.

In some implementations, the methods and wireless communication devices may be configured to determine, by the first AP, that the first AP cannot satisfy at least one of a plurality of uplink QoS parameters, inform the first STA which one of the plurality of uplink QoS parameters cannot be satisfied using a current session configuration, and determine to change the current session configuration to satisfy the plurality of uplink QoS parameters.

In some implementations, the methods and wireless communication devices may be configured to determine that the first AP cannot satisfy the first uplink QoS parameter, and inform the first STA that the first AP cannot satisfy the first uplink QoS parameter.

In some implementations, the methods and wireless communication devices may be configured to cause the first STA to associate with a second AP in response to a determination that the first AP cannot satisfy the first uplink QoS parameter.

In some implementations, the second AP is collocated with the first AP, and wherein the second AP and the first AP utilize different frequency bands.

In some implementations, the methods and wireless communication devices may be configured to determine, by the first AP, that the first AP cannot satisfy the first uplink QoS parameter due to channel conditions of a first wireless channel used by the first AP, and cause a second AP or a second STA to improve the channel conditions by reduce interference on the first wireless channel.

In some implementations, the methods and wireless communication devices may be configured to receive a traffic specification (TSPEC) message from the first STA.

In some implementations, the first uplink QoS parameter indicates at least one member selected from a group consisting of: requested minimum throughput, requested maximum latency, and requested maximum jitter.

In some implementations, the methods and wireless communication devices may be configured to receive at least a second uplink QoS parameter from a second STA, and distribute available uplink access resources between the first STA and the second STA based, at least in part, on the first uplink QoS parameter and the second uplink QoS parameter.

Another innovative aspect of the subject matter described in this disclosure can be implemented in a method for wireless communication. The method may be performed by wireless communication device for use in a first STA of a WLAN. The method may include sending at least a first uplink QoS parameter to a first AP, determining that the first AP has selected a selected uplink access mode to satisfy the first uplink QoS parameter, wherein the uplink access mode includes a SU access mode, a UL-MU scheduled access mode, a MU EDCA access mode, a LL access mode, or a combination thereof; and utilizing the uplink access mode to communicate uplink traffic to the first AP.

Another innovative aspect of the subject matter described in this disclosure can be implemented in a wireless communication device. The wireless communication device may be configured for use in a first STA of a WLAN. The wireless communication device may include at least one processor and at least one memory communicatively coupled with the at least one processor and storing processor-readable code that, when executed by the at least one processor, causes the wireless communication device to perform operations. The operations may include sending at least a first uplink QoS parameter to a first AP, determining that the first AP has selected a selected uplink access mode to satisfy the first uplink QoS parameter, wherein the uplink access mode includes a SU access mode, a UL-MU scheduled access mode, a MU EDCA access mode, a LL access mode, or a combination thereof; and utilizing the uplink access mode to communicate uplink traffic to the first AP.

In some implementations, the methods and wireless communication devices may be configured to determine that the first AP cannot satisfy the first uplink QoS parameter using the selected uplink access mode, and send a request for the first AP to indicate a desired uplink access mode that is different from the selected uplink access mode.

In some implementations, the methods and wireless communication devices may be configured to receive a message from the first AP indicating that the first AP cannot satisfy the first uplink QoS parameter, and establish a wireless association with a second AP that can satisfy the first uplink QoS parameter.

In some implementations, the methods and wireless communication devices may be configured to send a traffic specification (TSPEC) message from the first STA to the first AP.

In some implementations, the first STA is associated with the first AP using a multi-user (MU) association for use with the UL-MU scheduled access mode. In some implementations, the methods and wireless communication devices may be configured to determine that the UL-MU scheduled access mode cannot satisfy the first uplink QoS parameter and that a single-user (SU) association can satisfy the first uplink QoS parameter, and establish a wireless association with the first AP using the SU association with a SU access mode rather than the MU association.

In some implementations, the methods and wireless communication devices may be configured to utilize the UL-MU scheduled access mode for a first portion of the uplink traffic, and utilize the contention-based uplink access mode for a second portion of the uplink traffic.

Another innovative aspect of the subject matter described in this disclosure can be implemented in a mobile station. The mobile station may include at least one processor, and at least one memory communicatively coupled with the at least one processor and storing processor-readable code that, when executed by the at least one processor, causes the wireless communication device to perform operations. The operations may include sending at least a first uplink quality of service (QoS) parameter to a first access point (AP), determining that the first AP has selected a selected uplink access mode to satisfy the first uplink QoS parameter, wherein the uplink access mode includes a SU access mode, a UL-MU scheduled access mode, a MU EDCA access mode, a LL access mode, or a combination thereof, and utilizing the uplink access mode to communicate uplink traffic to the first AP. The mobile station may include at least one transceiver coupled to the wireless communication device, at least one antenna coupled to the at least one transceiver to wirelessly transmit signals output from the at least one transceiver and to wirelessly receive signals for input into the at least one transceiver, and a housing that encompasses the wireless communication device, the at least one transceiver and at least a portion of the at least one antenna.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
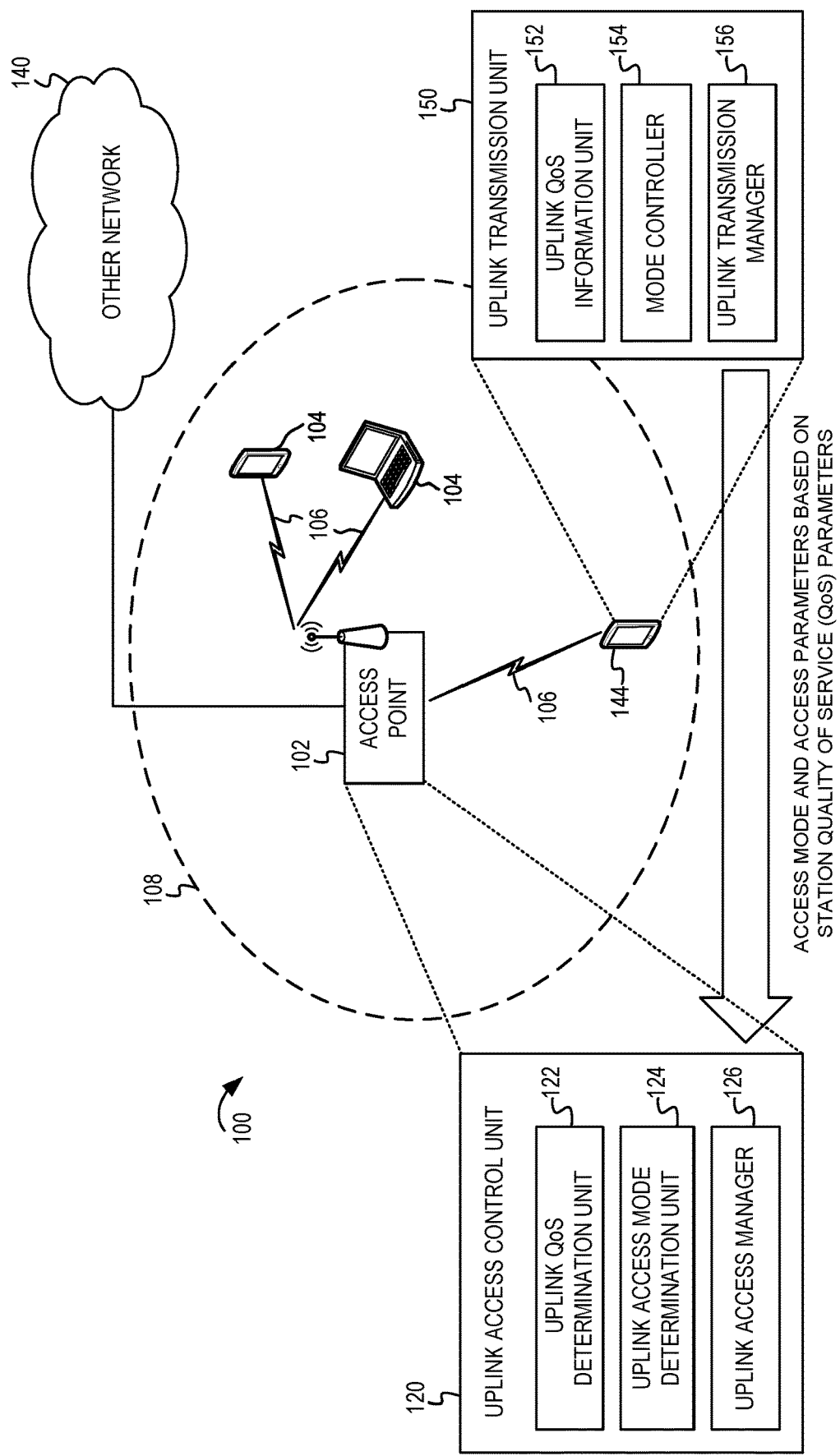
FIG. 1 shows a pictorial diagram of an example wireless communication network that supports uplink quality of service (QoS).

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input-multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Various implementations of this disclosure relate generally to the use of wireless resources for uplink communications in a WLAN. Some implementations more specifically relate to providing quality of service (QoS) for uplink communications from a station (STA) to an access point (AP). For brevity, the uplink communications are described in the context of traffic from a STA to an AP. In some other implementations, a peer STA may implement features of this disclosure that are described as being implemented by an AP, and as such, references to an AP below may refer to both an AP as well as such a peer STA. The device which is implementing the AP functionality may control wireless resources for one or more STAs in the WLAN.

In accordance with this disclosure, the AP may obtain at least one uplink QoS parameter from the STA. For example, the STA may transmit the uplink QoS parameter in a traffic specification message to the AP. The uplink QoS parameter may refer to throughput, delay, capacity, jitter, or latency, among other examples. A QoS parameter may also be referred to as a QoS requirement, and the terms may be used interchangeably herein. The AP may select an uplink access mode for the STA or allocate resources to the STA to satisfy the uplink QoS parameter. For example, the AP may select from among an uplink multi-user (UL-MU) scheduled access mode, a multi-user enhanced distributed control access (MU EDCA) access mode, a single-user (SU) access mode, and a low latency (LL) access mode. For example, for the UL-MU scheduled access mode, the AP may allocate resources to a STA using OFDMA techniques. In some implementations, the resources may be allocated using spatial division multiple access (SDMA), time division multiple access (TDMA), multiple input multiple output (MIMO) or frequency division multiple access (FDMA) techniques. For brevity, examples in this description may be based on time division multiplexing.

The resources may be allocated to satisfy the uplink QoS parameter. For some STAs or for some types of traffic, the AP may determine that the UL-MU scheduled access mode cannot satisfy the uplink QoS parameter. In some implementations, the AP may select another uplink access modes, such as the SU access mode, a MU-EDCA access mode or a LL access mode). The SU access mode, MU-EDCA access mode, and LL access mode are examples of contention-based access modes that may provide different levels of quality of service. Furthermore, in some implementations, the AP may select from among different prioritized access categories depending on the uplink QoS parameter. Contention-based uplink access may be referred to as unscheduled access because a STA would contend for access rather than having resources allocated or scheduled for it. However, even for contention-based uplink access, the selection of different contention parameters (associated with various access categories) may enable a STA to have a higher priority to gain access to the channel.

In accordance with this disclosure, the AP may attempt to satisfy a QoS parameter of the STA by selecting an appropriate uplink access mode. For example, the AP may select the UL-MU scheduled access mode and may allocate uplink resources for the STA to use for an UL MU physical protocol data unit (PPDU). UL MU scheduled access refers to a technique introduced in IEEE 802.11ax technical standard in which an AP may allocate resource units (RUs) and transmit a frame (such as a trigger frame) that informs the receiving STAs which RUs are assigned to the them for use in the UL MU PPDU (also called an HE trigger-based (TB) PPDU). By contrast, in the MU EDCA access mode (also introduced in IEEE 802.11ax), the AP uses a trigger frame to indicate RUs that available for STAs to contend for and (if contention is won) to transmit frames in an HE TB PPDU. One type of the MU EDCA access mode is also referred to as UL-OFDMA random access (UORA).

In this disclosure, the amount or periodicity of the allocated resources may be based on the uplink QoS parameter. For example, the AP may increase the amount of resources (such as bandwidth, number of spatial streams, resource unit size, modulation and coding scheme, among other examples) allocated to the STA, or may increase the quantity or timing of allocated resources for the STA. The AP (or the STA) may determine that the UL-MU scheduled access mode may not satisfy the QoS parameter. Therefore, in some cases, the AP may permit the STA to use another uplink access mode, such as a contention-based uplink access mode with higher priority than other STAs. For example, the AP may designate a LL access mode with a higher priority (or with other contention parameters) that give the STA a greater likelihood of winning the contention for the channel.

The examples of contention-based access techniques in this disclosure are based on enhanced distributed channel access (EDCA). However, other types of contention-based access and contention parameters may be used. Using EDCA, a set of parameters (referred to as contention parameters) may be associated with a particular access category (AC) and level of priority. Different access categories (having different levels of priority) may have different contention parameters that impact the likelihood that a STA will win contention for the channel. Examples of contention parameters include contention window boundaries (CWmin, CWmax), arbitration interframe space (AIFS), TXOP limit, and backoff algorithm. In some implementations, the AP may adjust or select the contention parameters to satisfy the QoS parameter of the STA. For example, the AP may redefine the access categories or adjust the contention parameters to give higher priority to STAs associated with particular QoS parameters. In some implementations, one or more new access categories may be defined to have a greater level of priority than existing access categories In some implementations, the AP may provide opportunities to the STA to transmit uplink data using a combination of the UL-MU access mode, and a contention-based uplink access mode (such as the MU EDCA access mode, the SU access mode, or the LL access mode). For example, the AP may indicate opportunities for the STA to use an MU EDCA access mode in addition to using the UL-MU scheduled access mode. Thus, the AP may permit the STA to use both UL-MU scheduled access mode and a contention-based uplink access mode so that the STA has more opportunity to transmit uplink data.

In some implementations, the AP may inform the STA whether it can satisfy the uplink QoS parameter. In some implementations, if the AP cannot satisfy the uplink QoS parameter (using the available uplink access modes), the AP (referred to a first AP) may indicate a second AP for the STA to utilize. In some implementations, the second AP may use a different frequency band as the first AP. In some implementations, the first AP and second AP may be collocated virtual APs in a single WLAN apparatus that operate different basic service sets (BSSs). Alternatively, if the AP cannot satisfy the uplink QoS parameter using a first uplink access mode (such as the UL-MU scheduled access mode), the AP may cause the STA to use a different uplink access mode (such as the SU access mode, the MU EDCA access mode, or the LL access mode). In some implementations, the AP may cause the STA to use the SU access mode if the SU access mode can provide a higher priority channel access to the communication medium. While the AP may prefer to use the UL-MU scheduled access mode, which may be more efficient for multiple STAs using the WLAN, the SU access mode may provide more resources for a STA that has an uplink QoS parameter that cannot be met by the UL-MU scheduled access mode.

This disclosure includes various techniques for an AP and STA to communicate QoS information and uplink access mode selection. For example, the STA may include one or more QoS parameters in a traffic specification (TSPEC) message to the AP. The AP may transmit a downlink transmission to the STA that indicates which uplink access mode for the STA to use. For example, the AP may send an indication to the STA that the UL-MU scheduled access mode for the STA is disabled by the AP. The AP can send a frame that contains an operating mode (OM) control field that indicates that the UL-MU scheduled access mode is disabled. In some implementations, this indication may be included in an UL MU Disable field of the OM control field. In some implementations, the AP may indicate that the UL-MU scheduled access mode is interrupted only for Data frames, in which case the AP can set the UL MU Data Disable field of the OM control field.

In some implementations, an AP may advertise the uplink access modes and access categories that the AP supports. For example, the AP may include an indication, in a beacon message or probe response message, that the AP supports a low latency access mode. If a STA has a QoS parameter that requires low latency, the STA may select an AP that supports the LL access mode. In some implementations, the AP-STA association may support LL access mode for all traffic. Alternatively, the AP and STA may use the LL access mode for particular traffic types (such as voice or video traffic).

This disclosure includes various techniques for an AP to set different contention parameters for different access categories for a STA. For example, the AP may include one or more of an EDCA Parameter Set element, an MU EDCA Parameter Set element, or a low latency (LL) EDCA Parameter Set element in a management frame (such as a Beacon, Probe Response, or Association Response, among other examples). STAs follow the parameters that are appropriate to their mode of operation. For example, if the STA has low latency traffic for a given access category (AC) or for all ACs, then the STA may use the LL EDCA parameters for a given AC or for all ACs. In some implementations, the AP may indicate to a STA to use another access mode or access category. For example, the AP may signal the change in a frame to a particular STA or to all STAs using the LL access mode. In some implementations, the AP can use an individually addressed frame to signal an uplink access mode switch to a single STA. For example, the AP may include an indicator in an OM control field or a new control field (such as a low latency control field), among other examples. In some implementations, the AP may include an indicator (such as a low latency disabled bit) to indicate that the STA cannot continue to use the low latency mode for a particular traffic type or for all traffic types. In some implementations, the AP may also indicate to the STA the duration of time for which the indicated mode is valid. Thus, the AP can selectively turn on and turn off low latency operation by selectively including the low latency disabled bit in a QoS frame (such as a QoS null frame). The QoS frame may have a traffic identifier (TID) field that maps to a particular access category, and as such, the AP may selectively enable or disable LL access mode for a particular access category used by a particular STA.

Particular implementations of the subject matter described in this disclosure can be implemented to realize one or more of the following potential advantages. An AP may manage wireless resources for multiple STAs while attempting to satisfy uplink QoS parameter(s) associated with one or more STAs. The AP may enable various combinations of access modes as appropriate to satisfy an uplink QoS parameter for a STA. Furthermore, some access modes may provide for increased QoS, which may be useful for low latency communications.

FIG. 1 shows a pictorial diagram of an example wireless communication network 100 that supports uplink QoS. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof). The WLAN 100 may provide access to another network 140. For example, the AP 102 may be connected to a gateway device (not shown) which provides connectivity to the other network 140. The WLAN 100 may include numerous wireless communication devices such as at least one access point (AP) 102 and multiple stations (STAs) 104 and 144 that may have a wireless association with the AP 102. Each of the STAs also may be referred to as a mobile station (MS), a mobile device, a mobile handset, a wireless handset, an access terminal (AT), a user equipment (UE), a subscriber station (SS), or a subscriber unit, among other possibilities. The STAs may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities. While AP 102 is described as an access point using an infrastructure mode, in some implementations, the AP 102 may be a STA which is operating as an AP. For example, the AP 102 may be a STA capable of operating in a peer-to-peer mode or independent mode. In other examples, the AP 102 may be a software AP (SoftAP) operating on a computer system.

A single AP 102 and the associated STAs 104 and 144 may be referred to as a basic service set (BSS), which is managed by the respective AP. An "unassociated STA" may not be considered part of the BSS because they do not have a wireless session established with the first AP 102. The BSS is identified by a service set identifier (SSID) that is advertised by the AP 102. The AP 102 periodically broadcasts beacon frames ("beacons") to enable any STAs within wireless range of the AP 102 to establish or maintain a respective communication link 106 (hereinafter also referred to as a "Wi-Fi link" or "wireless association") with the first AP 102. The various STAs in the WLAN are able to communicate with external networks as well as with one another via the AP 102 and respective communication links 106. To establish a communication link 106 with an AP 102, each of the STAs is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a Wi-Fi link with the selected first AP 102.

FIG. 1 additionally shows an example coverage area 108 of the AP 102, which may represent a basic service area (BSA) of the WLAN 100. While only one AP 102 is shown, the WLAN 100 can include multiple APs 102. As a result of the increasing ubiquity of wireless networks, a STA 104 and 144 may have the opportunity to select one of many BSSs within range of the STA or select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA can be covered by more than one AP 102 and can associate with different APs 102 at different times for different transmissions. Additionally, after association with an AP 102, a STA also may be configured to periodically scan its surroundings to find a more suitable AP with which to associate. For example, a STA 104 that is moving relative to its associated AP 102 may perform a "roaming" scan to find another AP having more desirable network characteristics such as a greater received signal strength indicator (RSSI).

The APs 102 and STAs 104, 144 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ay, 802.11ax, 802.11az, and 802.11ba). These standards define the WLAN radio and baseband protocols for the physical (PHY) and medium access control (MAC) layers. The APs 102 and STAs 104, 144 transmit and receive frames (hereinafter also referred to as "Wi-Fi communications") to and from one another in the form of physical layer convergence protocol (PLCP) protocol data units (PPDUs). Each PPDU is a composite frame that includes a PLCP preamble and header as well as one or more MAC protocol data units (MPDUs).

The APs 102 and STAs 104, 144 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104, 144 described herein also may communicate in other frequency bands, such as the 6 GHz band, which may support both licensed and unlicensed communications. The APs 102 and STAs 104, 144 also can be configured to communicate over other frequency bands such as shared licensed frequency bands, where multiple operators may have a license to operate in the same or overlapping frequency band or bands.

A first STA 144 may have a communication link 106 with the first AP 102. The first STA 144 may have uplink traffic to send to the first AP 102. For example, the first STA 144 may be have uplink traffic to be transmitted to the first AP 102 carrying audio, video, or data that requires a particular quality of service (defined by at least one QoS parameter). The first STA 144 may send an uplink QoS parameter in a message to the first AP 102 to indicate the uplink QoS parameter. For example, the uplink QoS parameter may include a minimum capacity, maximum latency, or maximum jitter, among other examples. Other types of QoS parameters may be possible. The first AP 102 may attempt to satisfy the uplink QoS parameter.

The first AP 102 may include an uplink access control unit 120 which manages the uplink resources of the WLAN. The uplink access control unit 120 may include an uplink QoS determination unit 122 which receives uplink QoS parameters from one or more STAs (including the first STA 144). The uplink access control unit 120 may include an uplink access mode determination unit 124 which can determine which uplink access mode the first STA 144 is to use to satisfy the respective uplink QoS parameter or parameters. The uplink access mode may be an UL-MU scheduled access mode (such as UL MU with EDCA disabled) or a contention-based uplink access mode (such as the SU access mode, the MU EDCA access mode, or the LL access mode). The uplink access control unit 120 may include an uplink access manager 126 to implement the mode selected by the uplink access mode determination unit 124. For example, for the UL-MU scheduled access mode, the uplink access manager 126 may allocate uplink resources for the first STA 144 in one or more UL MU PPDUs. For example, the uplink access manager 126 may allocate resource units (RUs) for the first STA 144 as well as one or more other STAs in the WLAN. The first AP 102 can transmit a trigger message to cause the STAs, including the first STA 144, to transmit uplink data in their allocated RUs. By indicating the allocations in trigger messages, the first AP 102 can manage the distribution of resources used by different STAs in UL MU PPDUs (such as UL MU-MIMO and OFDMA PPDUs).

The uplink access manager 126 may allocate resources to the first STA 144 based on the quality of service determined by the uplink QoS determination unit 122. If the uplink access mode determination unit 124 selects a contention-based uplink access mode for the first STA 144, the uplink access manager 126 may determine available periods of time when the communication media is available for contention-based access by one or more STAs. The uplink access manager 126 may inform the first STA 144 of the available periods for contention-based access. For example, the uplink access manager 126 may identify contention windows available for the SU access mode, the MU EDCA access mode or the LL access mode.

In some implementations, the uplink access manager 126 also may determine the access category for, or otherwise set the contention parameters for, the uplink mode based on the quality of service determined by the uplink QoS determination unit 122. For example, the uplink access manager 126 may inform the first STA 144 to use a particular access category (such as a low latency access category) based on the uplink QoS parameter. In some implementations, the uplink access manager 126 may manage which STAs are permitted to use the access categories for different types of traffic. For example, the uplink access manager 126 may enable or disable the low latency access category for particular STAs or for particular traffic types.

The first STA 144 may include an uplink transmission unit 150. The uplink transmission unit 150 may include an uplink QoS information unit 152 configured to provide one or more uplink QoS parameters to the uplink QoS determination unit 122. The uplink transmission unit 150 may include a mode controller 154 and an uplink transmission manager 156. The mode controller 154 may determine which mode (or combination of modes) the first AP 102 has selected for the first STA 144 to use. The mode controller 154 may activate the UL-MU scheduled access mode, the SU access mode, the MU EDCA access mode, the LL access mode, or a combination thereof. If the first AP 102 has instructed the first STA 144 to use an access mode that involves contention (such as the SU access mode, the MU EDCA access mode, or the LL access mode), the mode controller 154 also may determine which contention parameters (or set of parameters) should be used based on the contention-based access mode and an access category associated with the uplink data. An uplink transmission manager 156 may implement the contention parameters for the access category. For example, the uplink transmission manager 156 may implement the low latency contention parameters at the instruction of the mode controller 154.

Figure 2:
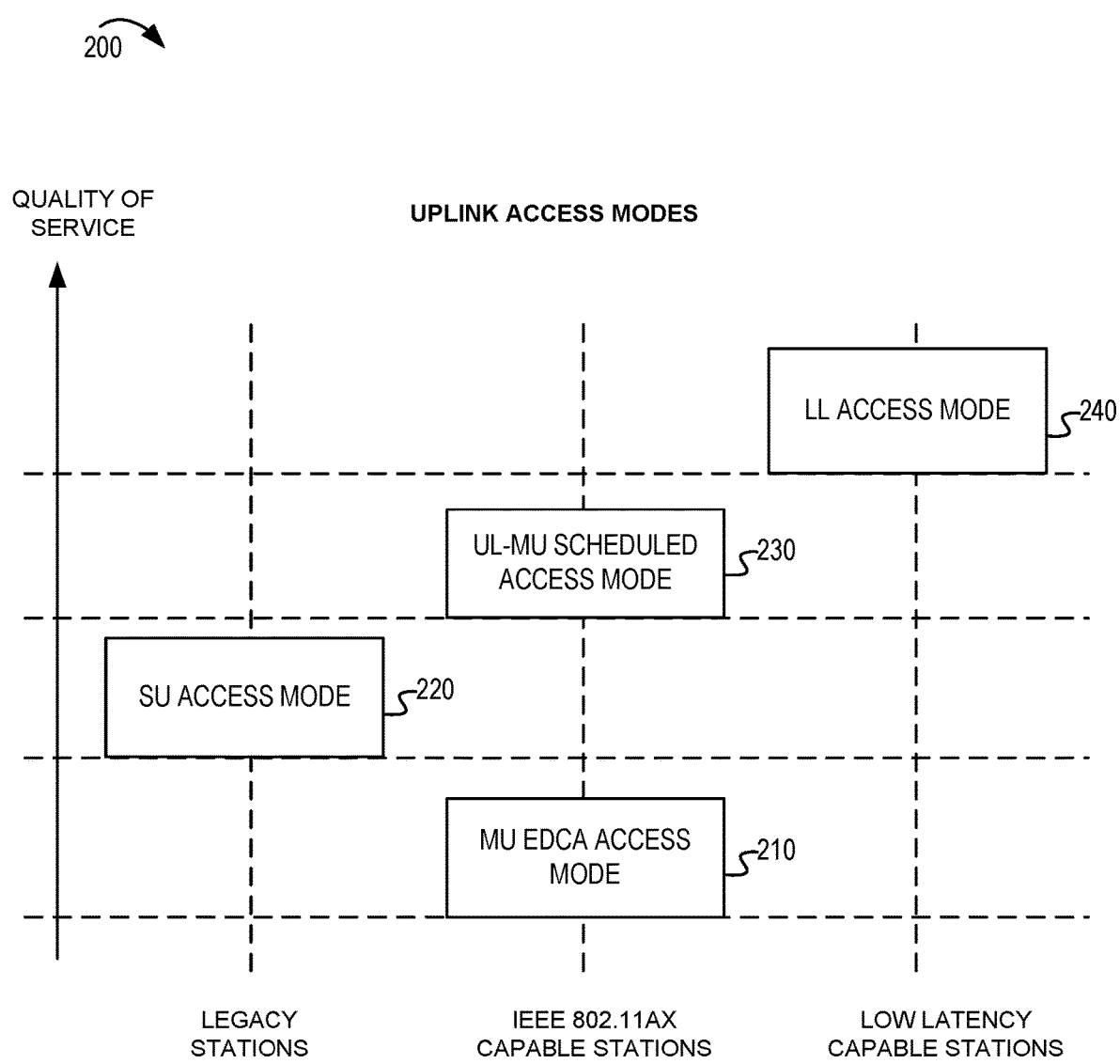
FIG. 2 shows relationships between QoS and various uplink access modes.
Figure 3:
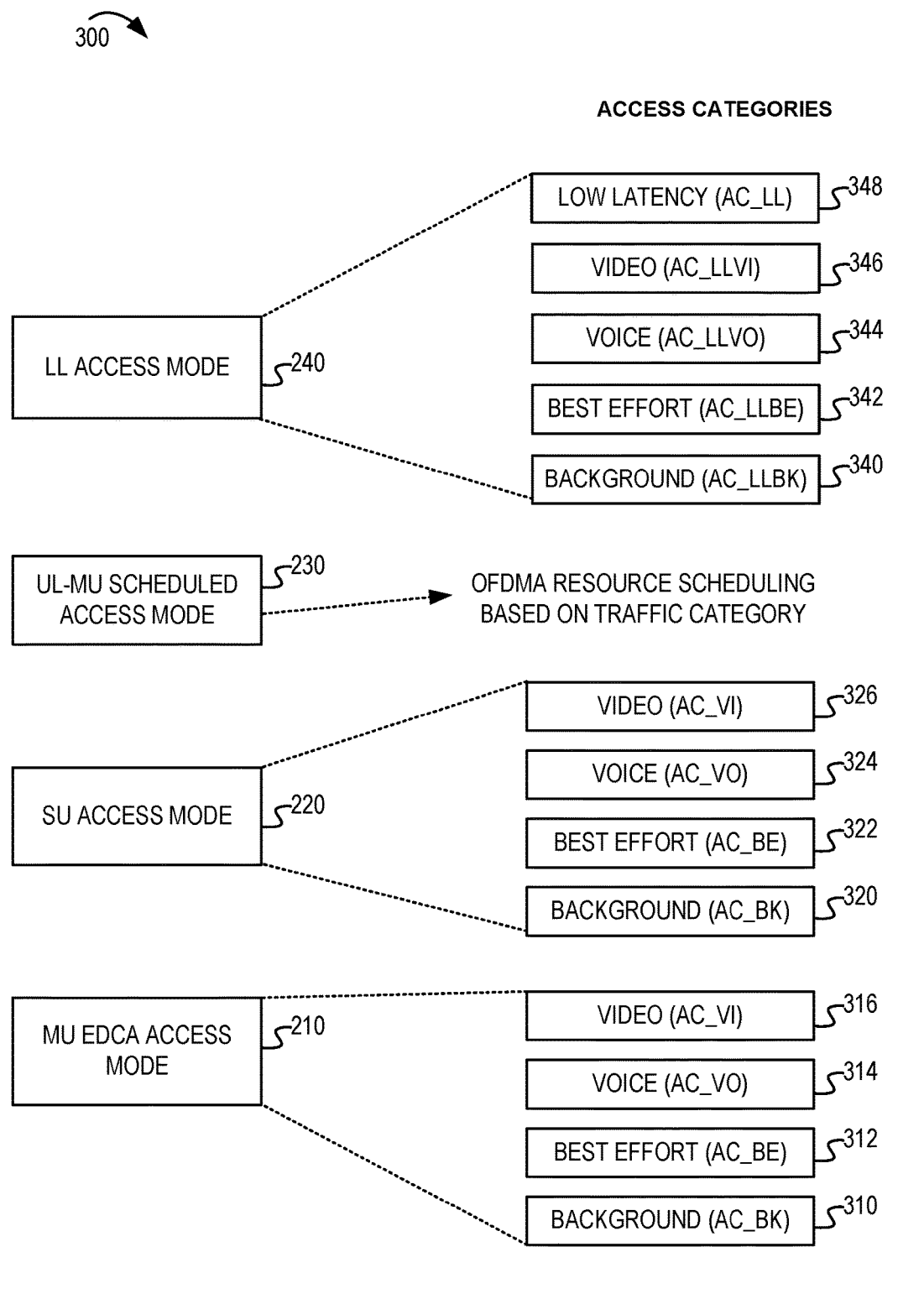
FIG. 3 shows various uplink access modes and various associated access categories.

In traditional WLAN deployments, the SU access mode was based on contention-based access in which a station obtains the use of the full channel in the form of a transmit opportunity (TxOP) when it wins contention. Different priorities and access categories may be used by the WLAN to implement the prioritization of traffic. More recently, the IEEE draft 802.11ax technical standard implemented OFDMA which supports more efficient use of a wireless channel using either the UL-MU scheduled access mode or the MU EDCA access mode. Using ODFMA and the UL-MU scheduled access mode, the first AP 102 may allocate portions of an UL MU PPDU to different stations. Using OFDMA and the MU EDCA access mode, the first AP 102 may trigger contention-based access for portions of a transmission opportunity by various STAs. However, it may be possible that the SU access mode provides a greater quality of service than the MU EDCA access mode since it includes full channel access or may have different contention parameters associated with the access categories. FIGS. 2 and 3 provide more detail about the uplink access modes and access categories described in this disclosure.

Typically, when a STA (such as the first STA 144) and an AP (such as the first AP 102) both support the UL-MU scheduled access mode, those devices would default to using the UL-MU scheduled access mode. As described above, the UL-MU scheduled access mode enables the first AP 102 to control the allocation and scheduling of uplink resources. The first AP 102 may send a trigger message (such as a "Basic Trigger frame") to one or more STAs to cause the STAs to send their uplink data in response to the trigger message. The first AP 102 may determine a schedule for the uplink data based on feedback from the STAs (such as feedback in response to a Beamforming Report poll (BRP) trigger, Buffer Status Report Poll (BSRP) Trigger, MU-BAR trigger, NDP Feedback report poll (NFRP) trigger, or Bandwidth query report poll (BQRP), among other examples). The feedback from the STAs may indicate an amount of data available for uplink transmission from the STA. Additionally, a STA may send a buffer status report (BSR) to indicate uplink buffered data. In a fully scheduled WLAN, the first AP 102 may disable the STAs from contending for access so that the first AP 102 can control the full schedule. For example, the first AP 102 may set an indicator (such as a bit or value in an operation element) to a first value or second value to indicate whether the first STA 144 is permitted to contend for access. Disablement of contention-based access may be on a per-BSS basis, per-STA basis, or per-AC basis. For example, the first AP 102 may set an UL MU Disable bit to a first value (such as "0") to indicate that the first AP 102 is operating in UL MU mode (scheduled) and to cause the STAs to disable contention-based access. Alternatively, or additionally, the first AP 102 can include an indicator to a particular STA (such as the first STA 144) to cause the first STA 144 to disable contention. For example, the first AP 102 may set the UL MU Disable bit in the OM control field to the first value. In some implementations, the first STA 144 may disable contention-based access for a particular AC. For example, the TID of the frame that carries the UL MU Disable bit (set to the first value "0") may correspond to the AC for which the first AP 102 wants the first STA 144 to disable contention-based access.

In traditional deployments of a fully scheduled WLAN, the first AP 102 may not be required to send trigger messages to trigger a particular STA with regularity. The first AP 102 may determine which STAs to trigger with each trigger message. In this disclosure, the uplink access manager 126 may manage the periodicity of trigger messages to the first STA 144 based on the uplink QoS parameters of the first STA 144. For example, the uplink access manager 126 may cause trigger messages to periodically trigger the first STA 144 so that the first STA 144 can transmit uplink data within a latency requirement. The periodicity of the trigger messages may be determined based on the QoS parameters (such as latency, jitter, or data rate, among other examples) that the first STA 144 expects the first AP 102 to fulfill. The first AP 102 may not poll the first STA 144 every polling opportunity but rather may rely on the BSRs the first STA 144 is providing to the first AP 102, and other feedback it receives from the first STA 144. The first 102 may attempt to satisfy one or more (or all) of the uplink QoS parameters. Alternatively, the first AP 102 may negotiate the uplink QoS with the first STA 144.

The uplink QoS parameters may be related to different traffic types, access categories, traffic identifiers, among other examples. In some implementations, the uplink QoS parameter(s) may be provided as a default table in a wireless communication standard specification, so that a standard-compliant AP (such as the first AP 102) may be specified to satisfy different QoS parameters. The first AP 102 also may be exempt from the uplink QoS parameters in case the channel conditions are not satisfactory (or the network is overloaded) for satisfying the uplink QoS parameters of the first STA 144. In this case, the first AP 102 may notify the first STA 144 of such conditions so that the first STA 144 may take action. For example, in cases where the first AP 102 cannot satisfy the QoS parameters of the first STA 144, the first STA 144 may look for another AP in the area. Alternatively, the first AP 102 may permit the first STA 144 to operate in the SU access mode, the MU EDCA access mode or the LL access mode (using contention-based access such as EDCA). As mentioned above, there may be different ways for the first AP 102 to indicate enablement or disablement of contention-based access. For example, the first AP 102 may set an UL MU Disable bit to a second value (such as "1") to indicate that the first AP 102 is operating in the MU EDCA access mode and to cause the first STA 144 to enable contention-based access. For example, the first AP 102 may set the UL MU Disable bit in OM control fields to the second value. The first AP 102 may set the UL MU Data Disable bit to "1" if only data transmissions follow this pattern. Similar signaling may be defined to enable or disable the use of the LL access mode described in this disclosure. Although described as the first AP 102 indicating the mode, in some implementations, the first STA 144 also may be capable of indicating an operating mode (or a request for a particular uplink access mode) using one or more bits in uplink transmissions for particular access categories.

In the SU access mode, the first STA 144 may contend for channel access and then utilize the full channel width for uplink PPDUs. In some implementations, the first AP 102 may inform the first STA 144 of available time periods for contention-based access. Alternatively, if the uplink QoS information unit 152 determines that the uplink QoS parameters are not satisfied by the resources allocated by the uplink access manager 126, the uplink QoS information unit 152 may inform the uplink QoS determination unit 122 and request that the uplink access manager 126 allocate time intervals during which the first STA 144 can contend for additional uplink resources.

In some implementations, the uplink QoS determination unit 122 may determine that the first AP 102 is not able to satisfy the uplink QoS parameters of the first STA 144. In some implementations, the first AP 102 may recommend (or assign) the first STA 144 to a second AP (not shown) that has sufficient resources to accommodate the uplink QoS parameters of the first STA 144. In some such implementations, the first STA 144 may still continue to be associated with the first AP 102 while offloading its traffic via the second AP. Alternatively, the first STA 144 may discontinue using the first AP 102 and re-associate with the second AP. The second AP may be collocated with the first AP 102. For example, the first AP 102 may be implemented in a WLAN apparatus that has multiple WLAN interfaces such that it can operate multiple BSSs. A first BSS may be associated with a first AP 102 and may utilize a first frequency band (such as 5 GHz). A second BSS may be associated with a second AP and may utilize a second frequency band (such as 2.4 GHz). Various frequency bands may be used for different BSSs (such as 2.4 GHz, 5 GHz, 6 GHz, or 60 GHz, among other examples).

In some implementations, the first AP 102 may attempt to satisfy multiple uplink QoS parameters from the first STA 144. For example, the first AP 102 may attempt to satisfy both a first uplink QoS parameter and a second uplink QoS parameter. If the first AP 102 can only satisfy a subset of the uplink QoS parameters, the first AP 102 may inform the first STA 144 which uplink QoS parameters cannot be satisfied using the current session configuration. The first AP 102 or the first STA 144 can determine whether to change the current session configuration. For example, they may change from the UL-MU access mode to one of the contention-based uplink access modes (such as the SU access mode, MU EDCA access mode or the LL access mode). The first AP 102 may inform the first STA 144 which mode is selected using various signaling, such as an OM Control field, UL MU Disable bit, a new indicator, or a new field, among other examples. In some implementations, the technical specification may define new parameters or fields for indicating that the first STA 144 is to use a LL access mode, or for changing contention parameters with particular access categories. Alternatively, the first AP 102 and the first STA 144 may negotiate which uplink access modes to use based on a plurality of uplink QoS parameters.

In some implementations, the first AP 102 (or the first STA 144) may determine that poor channel conditions are preventing the first AP 102 from satisfying the uplink QoS parameters. For example, channel interference may impact a first wireless channel used by the first AP 102 for a BSS. An overlapping BSS (OBSS) from a second AP also may be using the first wireless channel. The first AP 102 may inform (or coordinate) with the second AP to reduce the channel interference so that the first AP 102 can satisfy the uplink QoS parameters. Alternatively, if the first STA 144 moves to a second AP (because the first AP 102 cannot satisfy the uplink QoS parameters), the first STA 144 may send a message to the first AP 102 to cause the first AP 102 to coordinate with the second AP to improve performance for the first STA 144.

FIG. 2 shows relationships between QoS and various uplink access modes. The SU access mode 220 provides quality of service based on the priority of access categories (as, for example, described in FIG. 3). Some legacy STAs may only support the SU access mode 220. For example, legacy STAs may include non-high-throughput (non-HT) STAs, high throughput (HT) STAs, or very high throughput (VHT) STAs, as described in IEEE 802.11 and amendments thereto. However, as the WLAN protocols have evolved to support both UL MU-MIMO and OFDMA, including simultaneously, more uplink access modes may be possible. For example, IEEE 802.11ax describes high efficiency (HE) STAs that support the UL-MU scheduled access mode 230 and the MU EDCA access mode 210). Because the UL-MU scheduled access mode includes scheduling by an AP, the AP may control the scheduling of resources to support a greater quality of service using the UL-MU scheduled access mode 230 compared to the SU access mode 220. However, it is possible that the MU EDCA access mode 210 provides a lower quality of service compared to the SU access mode 220 because the MU EDCA access mode 210 would be used to gain access to only portions of a transmission opportunity or only portions of the channel. The UL-MU scheduled access mode 230 and the MU EDCA access mode 210 were introduced in IEEE 802.11ax and are supported by high efficiency (HE)-capable devices, and expected to be supported by extremely high throughput (EHT)-capable devices.

A LL access mode 240 may provide an even greater quality of service as compared to the UL-MU scheduled access mode 230. The LL access mode 240 may be based on one or more new access categories specified in a technical standard (such as IEEE 802.11be). The LL access mode may be used by LL-capable STAs or by a group of EHT STAs that require satisfaction of certain QoS requirements. The LL access mode 240 may be used on a per-STA or per-AC basis depending on implementations or based on the QoS parameters supported by the LL access mode 240.

FIG. 3 shows various uplink access modes and various associated access categories. The chart 300 shows the relative quality of service for each AC defined for the uplink access modes. The ACs may include access categories for background, best effort, voice, and video. For example, a background access category (AC_BK) 310 may have a lower quality of service compared to a best effort access category (AC_BE) 312. A voice access category (AC_VO) 314 may have a higher quality of service than the AC_BE 312. A video access category (AC_VI) 316 may have a higher quality of service than the AC_VO 314.

The quality of service for the access categories may be based on the contention parameters or levels of priority for each AC. The contention parameters may include a minimum contention window (CWmin), a maximum contention window (CWmax), an arbitration interframe space number (AIFSN), or a maximum transmission opportunity, among other examples. For example, Table 1 shows some example contention parameters for the access categories.

TABLE 1

Example contention parameters for access categories

| AC | CWmin | CWmax | AIFSN | Max TXOP |
|---|---|---|---|---|
| Video (AC_VI) | 7 | 15 | 2 | 3.008 ms |
| Voice (AC_VO) | 3 | 7 | 2 | 1.504 ms |
| Best Effort (AC_BE) | 15 | 1023 | 3 | 0 |
| Background (AC_BK) | 15 | 1023 | 7 | 0 |

As described in FIG. 2, the different uplink access modes also impact the quality of service. For example, AC_BK 312 for the MU EDCA access mode 210 may be lower than the AC_BK 320 for the SU access mode 220. The SU access mode 220 may have similarly defined access categories as described above (AC_BK 320, AC_BE 322, AC_VO 324, and AC_VI 326). The UL-MU scheduled access mode 230 may use traffic categories and scheduling of resources to provide a higher quality of service than can be provided by the SU access mode 220.

The LL access mode 240 may provide a higher quality of service compared to the UL-MU scheduled access mode 230. The LL access mode 240 may define similar ACs as described above. However, the contention parameters associated with each AC may be adjusted so that the ACs for the LL access mode 240 receive a higher priority to the channel. The ACs may include one or more of background (AC_LLBK) 340, best effort (AC_LLBE) 342, voice (AC_LLVO) 344, or video (AC_LLVI) 346. Alternatively, or additionally, a new access category may be defined as a low latency access category (AC_LL) 348. Each of the ACs (AC_LLBK, AC_LLBE, AC_LLVO, AC_LLVI, or AC_LL) may be associated with different contention parameters that give them a higher quality of service compared to the equivalent ACs defined for the SU access mode 220 and the MU EDCA access mode 210. For example, they may have a smaller AIFSN, more favorable contention windows, or larger TXOPs, among other examples.

In some implementations, the AP may advertise the contention parameters that are defined for the low latency ACs. For example, the AP may transmit a beacon message, probe response, or another management frame that indicates the contention parameters. The AP may adjust the contention parameters as needed to meet the quality of service requirements of some or all of the STAs associated with the AP.

Figure 4A:
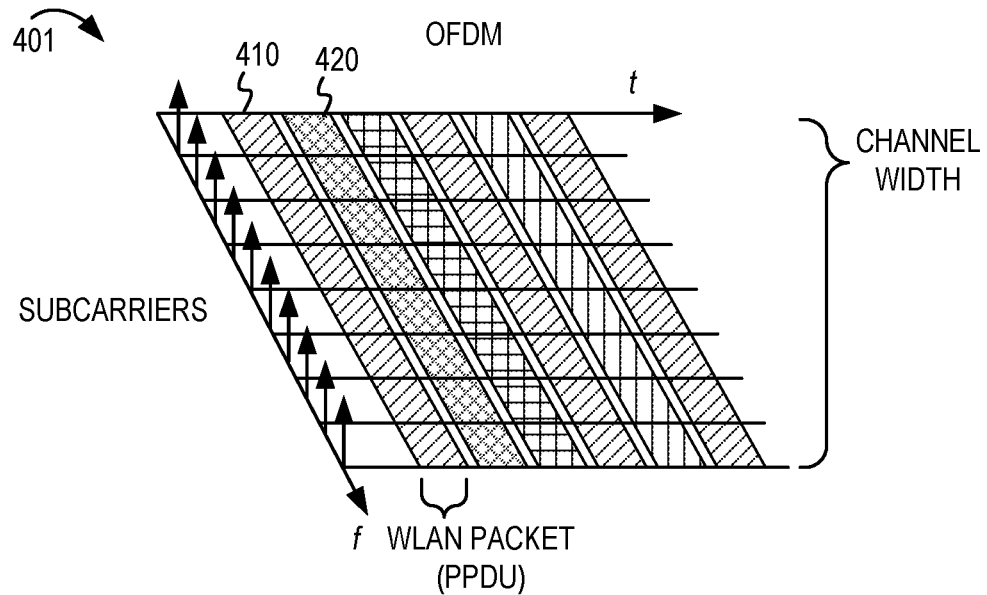
FIG. 4A shows a conceptual diagram of orthogonal frequency division multiplexing (OFDM).

FIG. 4A shows a conceptual diagram of OFDM 401. For example, OFDM may be used with the SU access mode. The OFDM channel width may include multiple subcarriers. A WLAN packet (also referred to as a PPDU) includes data that is encoded using the subcarriers of the channel width. For example, a first STA may transmit a first PPDU 410 at a first time period. During a second time period, a second STA may transmit a second PPDU 420. The PPDUs 410 and 420 may extend for different lengths of time. Typically, the first STA and the second STA (and any other STAs in the BSS) will contend for access to the channel. Once a STA wins the contention, the STA can use the channel for transmission of a PPDU. As shown in FIG. 4A, different shading patterns for the PPDUs indicate that different STAs may utilize the wireless channels sequentially, one at a time. However, this communication structure may be inefficient if a STA does not have enough data to justify using the full channel width.

Figure 4B:
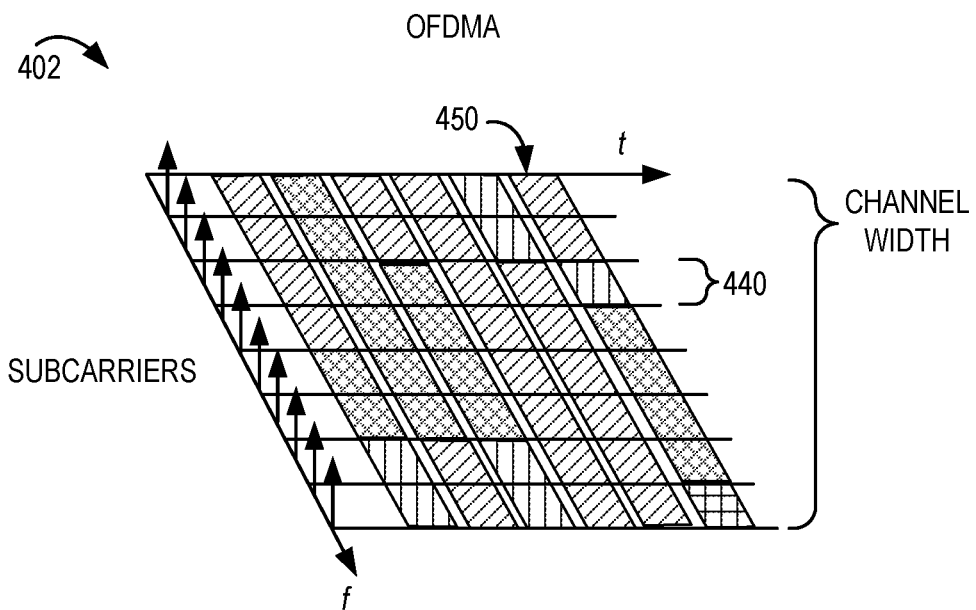
FIG. 4B shows a conceptual diagram of orthogonal frequency division multiple access (OFDMA).

FIG. 4B shows a conceptual diagram of OFDMA 402. OFDMA may be used with the UL-MU scheduled access mode, the MU EDCA access mode, or the LL access mode. Using ODFMA, the channel width is subdivided into a plurality of resource units (RUs). Each RU may include a different quantity of subcarriers. An AP may allocate different RUs for different STAs. For example, an UL MU PPDU 450 may include different RUs allocated for a first STA, a second STA, a third STA, and a fourth STA. One RU 440 is allocated for a STA to transmit uplink data in the UL MU PPDU 450, while other RUs are allocated for different STAs.

The allocation of RUs may be used to schedule uplink access. For example, an AP may transmit a trigger message that indicates which RUs are allocated to particular STAs to use for uplink traffic in the UL MU PPDU that follows the trigger message. In some implementations, the AP may allocate some RUs (referred to as random access resource units, or RA-RUs) for contention-based access. One or more STAs may use an UL OFDMA-based random access (UORA) technique to transmit uplink data via the RA-RUs.

Figure 5A:
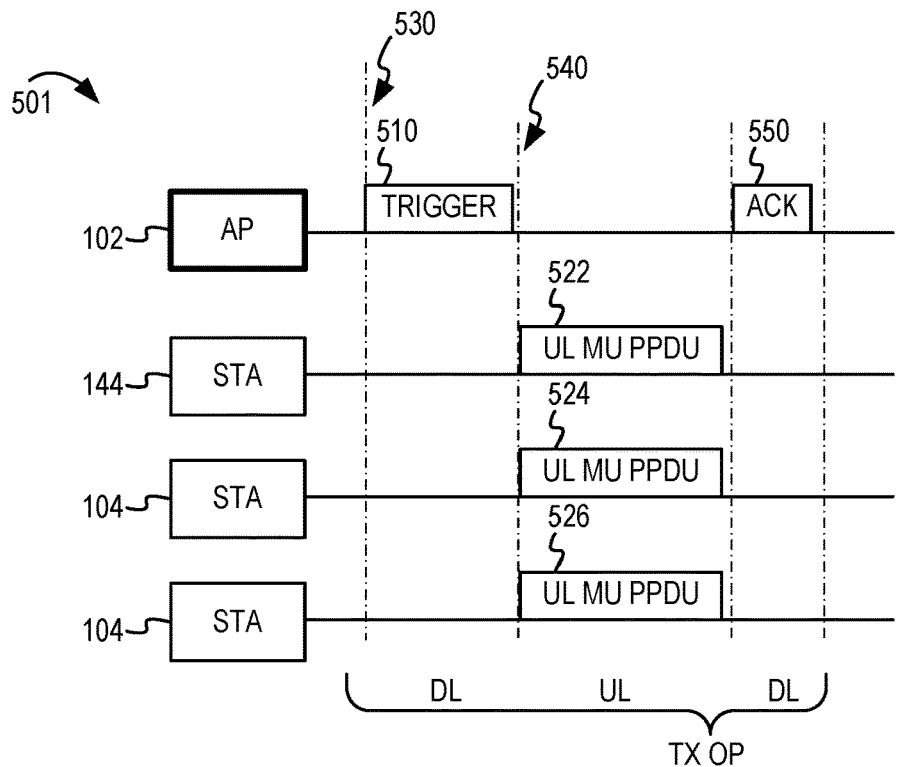
FIG. 5A shows a conceptual diagram of an uplink multi-user (UL-MU) scheduled access mode.

FIG. 5A shows a conceptual diagram 501 of an UL-MU scheduled access mode. A first AP 102 may schedule uplink access for the first STA 144 and the other STAs 104. At the beginning 530 of a transmission opportunity (TXOP) held by the first AP 102, the first AP 102 may transmit a trigger message 510. The trigger message 510 may include a trigger frame or other scheduling message which informs the STAs 144 and 104 of a schedule for uplink transmissions. After the trigger message, an uplink transmission window 540 begins. During the uplink transmission window 540, the STAs 144 and 104 may transmit uplink date using their allocated RUs. For example, the first STA 144 may transmit an UL MU PPDU 522 in an RU allocated for the first STA 144. Similarly, STAs 104 may transmit respective UL MU PPDUs 524, 526 in their respective RUs. Following the uplink transmission window, the first AP 102 may transmit an acknowledgment 550 that acknowledges the multiple UL MU PPDUs 522, 524, 526.

During each TXOP, the first AP 102 may indicate allocated RUs for different STAs. In accordance with this disclosure, the first AP 102 may send a sufficient quantity of subsequent trigger messages (for TXOPs) so that the first STA 144 has enough opportunities to transmit uplink data in allocated RUs.

Figure 5B:
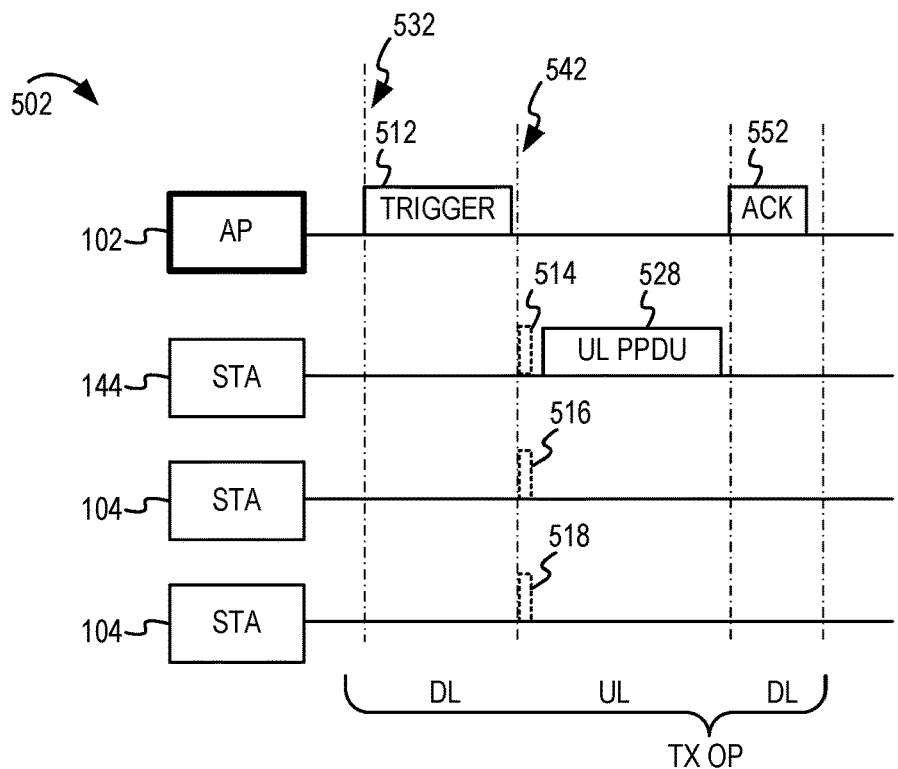
FIG. 5B shows a conceptual diagram of an MU enhanced distributed control access (EDCA) access mode.

FIG. 5B shows a conceptual diagram 502 of an MU enhanced distributed control access (EDCA) access mode. The example MU EDCA access mode in FIG. 5B includes the first AP 102 controlling the allocation of RA-RUs available for contention during the TXOP of the first AP 102. The first AP 102 may send a trigger message 512 during the TXOP (such as at the beginning 332 of the TXOP). The trigger message 512 may indicate contention resources (for example, the allocated RA-RUs), which are available for one or more STAs to contend for uplink access. At the beginning of an uplink transmission window 542, the first STA 144 and the other STAs 104 may contend (shown at 514, 516, and 518) for the RA-RUs. For example, the first STA 144 may win the contention and send the uplink PPDU 528. The first AP 102 may send an acknowledgment 552 to acknowledge the uplink PPDU 528.

While FIG. 5B shows a trigger message 512 that prompts contention, other forms of contention-based access may not include the use of a trigger message. For example, contention-based access may use EDCA or other forms of contention to gain access to a wireless channel during an available unscheduled uplink access time period. The first AP 102 may send a configuration message (not shown) which indicates unscheduled uplink access periods, which the first AP 102 does not trigger. During the unscheduled uplink access periods, one or more STAs may contend for access to the channel.

In some implementations, a priority-based contention scheme may be used. For example, the first STA 144 may have a higher priority than the other STAs 104. In some implementations, priorities may be assigned or modified by the first AP 102. For example, the first AP 102 may assign a higher priority to the first STA 144 if the first STA 144 has a higher QoS parameter than the other STAs 104. In some implementations, the first AP 102 may decrease the priority of a STA that is consuming too many uplink resources.

As described above, the TXOP may be used for both UL-MU scheduled access mode and a contention-based mode. For example, the TXOP may have some RUs allocated for UL-MU scheduled access mode and some RUs (for example, RA-RUs) allocated for the MU EDCA access mode. Alternatively, or additionally, the TXOP may have a time-division such that a first time period within the TXOP uses the UL-MU scheduled access mode and a second time period of the TXOP may use the MU EDCA access mode. The first AP 102 may allocate RUs for the first STA 144 to use during the UL-MU scheduled access mode and may permit the first STA 144 to use RA-RUs during the MU EDCA access mode.

Figure 5C:
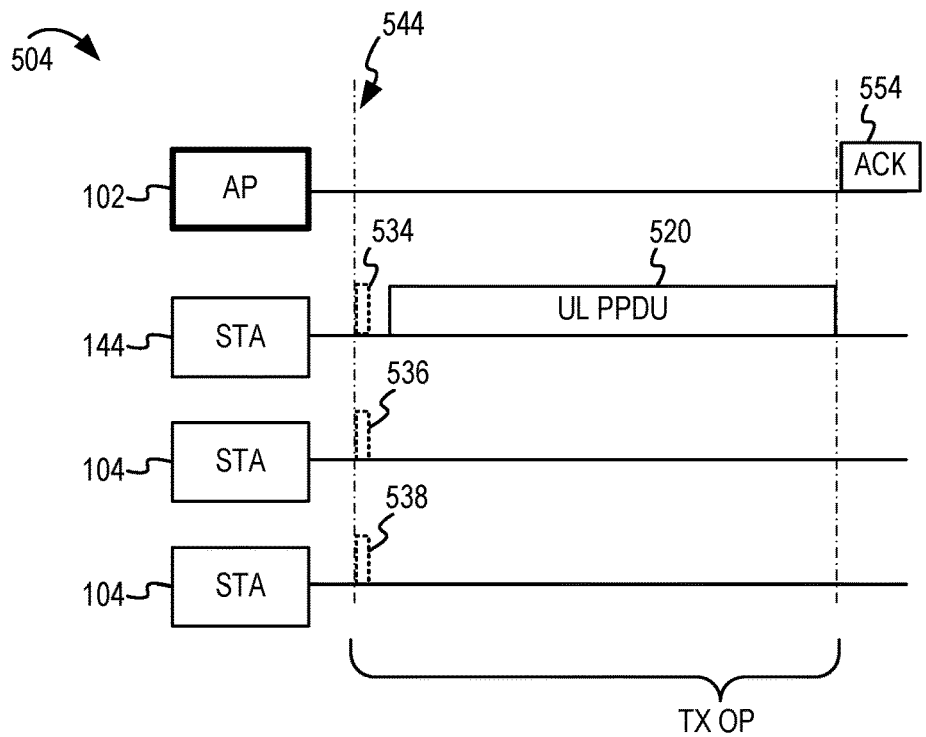
FIG. 5C shows a conceptual diagram of a single-user (SU) access mode.

FIG. 5C shows a conceptual diagram 504 of the SU access mode. The example SU access mode in FIG. 5C can be used by legacy stations that do not support, or other devices which have disabled, the UL-MU scheduled access mode or the MU EDCA access mode. At the beginning of a contention window 544, the first STA 144 and the other STAs 104 (and possibly also the first AP 102) may contend (shown at 534, 536, and 538) for the channel. For example, the first STA 144 may win the contention and send the uplink PPDU 520. The first AP 102 may send an acknowledgment 554 following an interframe space (IFS) (such as a short interframe space (SIFS)) after the uplink PPDU 520. The SU access mode may be used with OFDM to gain full channel access (rather than gaining access to individual RUs using OFDMA).

Figure 5D:
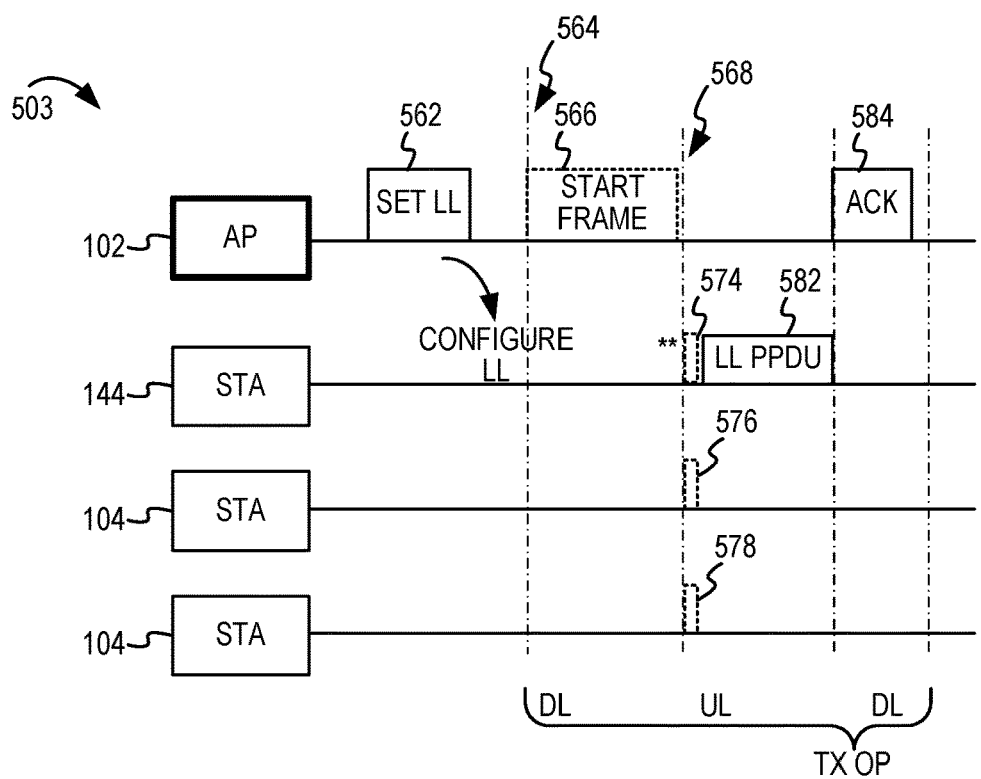
FIG. 5D shows a conceptual diagram of a low latency (LL) access mode.

FIG. 5D shows a conceptual diagram 503 of the LL access mode. In various implementations, the LL access mode may be used with EDCA on the full channel or a portion of the OFDMA channel. For example, the LL access mode may utilize EDCA such as the contention-based access described in FIG. 5C. Alternatively, the LL access mode may use EDCA within a portion of the TXOP after being triggered by the first AP 102, such as described in FIG. 5B. However, in either example, the LL access mode may be associated with one or more contention parameters that enable the first STA 144 to have a higher priority or likelihood to win the contention for the channel.

The example LL access mode in FIG. 5B is based on an example using low latency EDCA parameters within a TXOP owned by a first AP 102. The first AP 102 may control which STAs (such as the first STA 144) are permitted to use the LL access mode and the LL access mode parameters. The first AP 102 may configure LL access mode by sending a configuration message 562 or other indicator to a particular STA, such as the first STA 144. The first AP 102 may send a start frame 566 (such as a trigger frame, among other examples) at the beginning 564 of a TXOP. The start frame 566 may indicate contention resources which are available for one or more STAs to contend for uplink access. In some implementations, another indicator, different than the start frame 566, can be used to signal the beginning of a TXOP. For example, the start of the TXOP may occur after an IFS following a previous communication (not shown), and as such, there may not be an explicit indicator to signal the start of the TXOP. At the beginning of an uplink transmission window 568, the first STA 144 and the other STAs 104 may contend (shown at 574, 576, and 578) for the channel (or for the RA-RUs). Because the first STA 144 was configured with low latency access parameters, the first STA 144 is more likely (in some implementations effectively guaranteed) to win the contention. After winning the contention, the first STA 144 may send the uplink PPDU 588. The first AP 102 may send an acknowledgment 584 to acknowledge the uplink PPDU 588.

In some implementations, the contention algorithm for the LL access mode may be different from a traditional EDCA contention algorithm. For example, in a traditional EDCA contention algorithm, the first STA 144 may have an exponentially-increasing backoff time if a collision is detected. However, with the LL access mode, the contention algorithm may not use the exponentially-increasing backoff time. For example, the backoff time may be constant, increase linearly (or according to some other function), or may even decrease for devices that are using the LL access mode. In some implementations, the CWmin or CWmax values may be set to prevent a backoff time. Thus, the LL access mode may be associated with a more aggressive contention algorithm for those STAs (such as the first STA 144) that are using the LL access mode. To prevent the first STA 144 from using the LL access mode without approval, a technical standard may specify the conditions for which the first STA 144 may request the LL access mode. Furthermore, the technical standard may require the first AP 102 to approve the use of the LL access mode before the first STA 144 uses the access category or contention parameters associated with the LL access mode. In some implementations, multiple APs in the same neighborhood may negotiate a common set of LL EDCA parameters for their associated STAs.

Figure 6A:
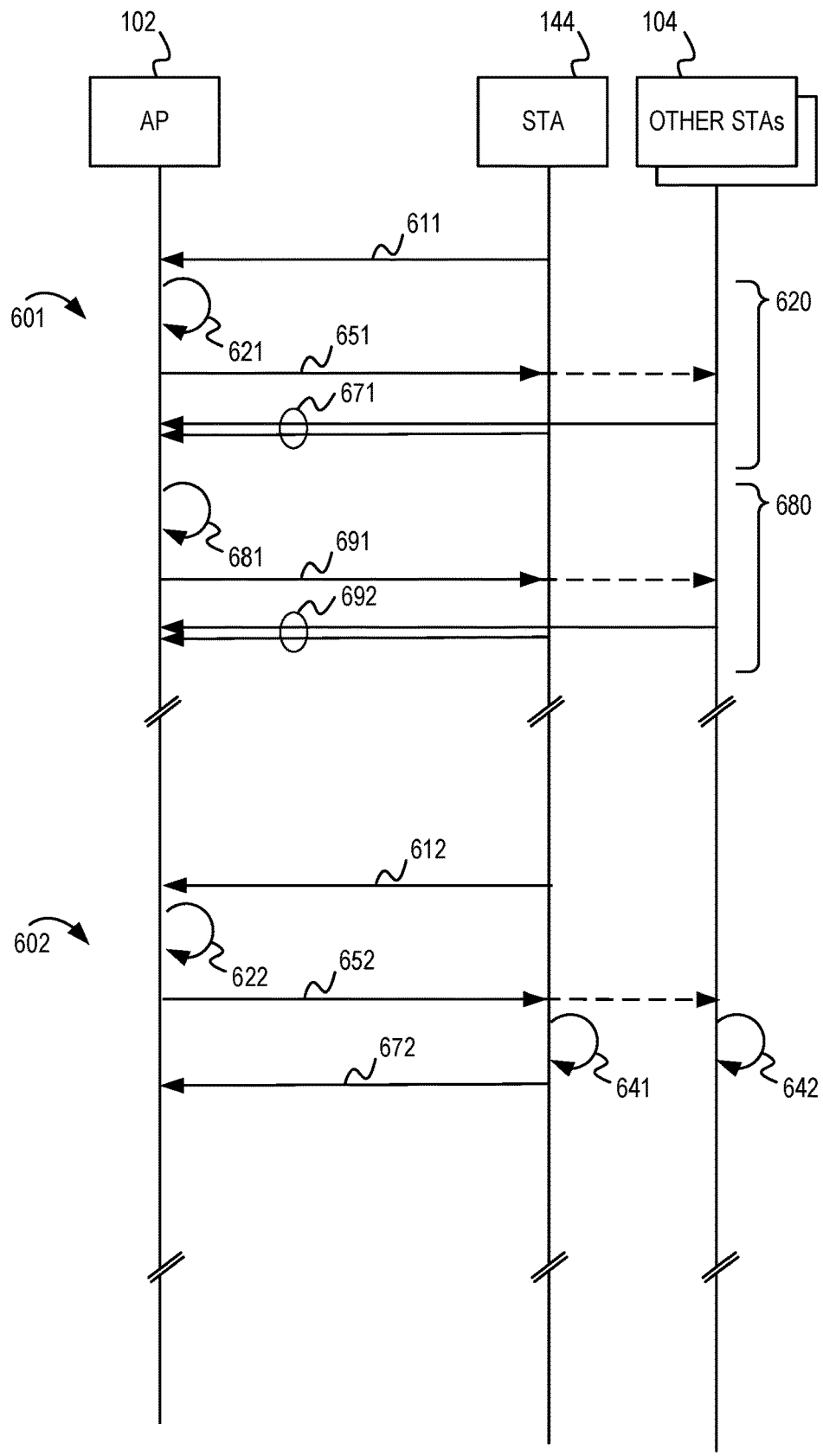
FIG. 6A shows a message flow diagram illustrating example uplink access modes.

FIG. 6A shows a message flow diagram illustrating example uplink access modes. In particular, FIG. 6A shows an example of an UL-MU scheduled access mode 601 and an example of a contention-based uplink access 602 (such as the SU access mode, the MU EDCA access mode, or the LL access mode).

In the UL-MU scheduled access mode 601, the first AP 102 may allocate resources for uplink wireless communications from the first STA 144 and other STAs 104. The first STA 144 may send a first message 611 to the first AP 102 to inform the first AP 102 of one or more uplink QoS parameter(s) of the first STA 144. In some implementations, the first message 611 may include a traffic specification (TSPEC) that describes a data traffic flow from the first STA 144. At process 621, the first AP 102 may determine how an amount of resources and a scheduling frequency to allocate to the first STA 144 based on the uplink QoS parameters. As described above, one examples of an uplink QoS parameter is a latency QoS parameter. The first AP 102 may determine a periodicity (such as 1 ms, 2 ms, 5 ms, or 10 ms, among other examples) for how often to trigger the first STA 144 for uplink transmissions such that the periodicity will provide sufficient uplink transmission opportunities for the first STA 144 to satisfy the uplink QoS parameters.

In a first TXOP 620, the first AP 102 may transmit a first trigger message 651 that schedules RUs for the first STA 144 and one or more other STAs 104. The first STA 144 and one or more other STAs 104 may transmit UL MU PPDU 671 using the resources allocated in the first trigger message 651. In a second TXOP 680, the first AP 102 may determine (shown as process 681) whether to trigger the first STA 144 based on the QoS parameters associated with the first STA 144. The first AP 102 may transmit a second trigger message 691 that indicates which STAs (including the first STA 144) are allocated resources in the second TXOP 680. The first STA 144 and one or more other STAs 104 may transmit UL MU PPDUs 672 based on the resources allocated in the second trigger message 691.

Although FIG. 6A shows the first STA 144 is triggered in consecutive TXOPs for illustrative purposes, it may not be appropriate for the first AP 102 to trigger the first STA 144 in consecutive TXOPs. In a heavily utilized WLAN, the first AP 102 may trigger the first STA 144 every Nth TXOP, where N is determined based on the uplink QoS parameters.

Figure 6B:
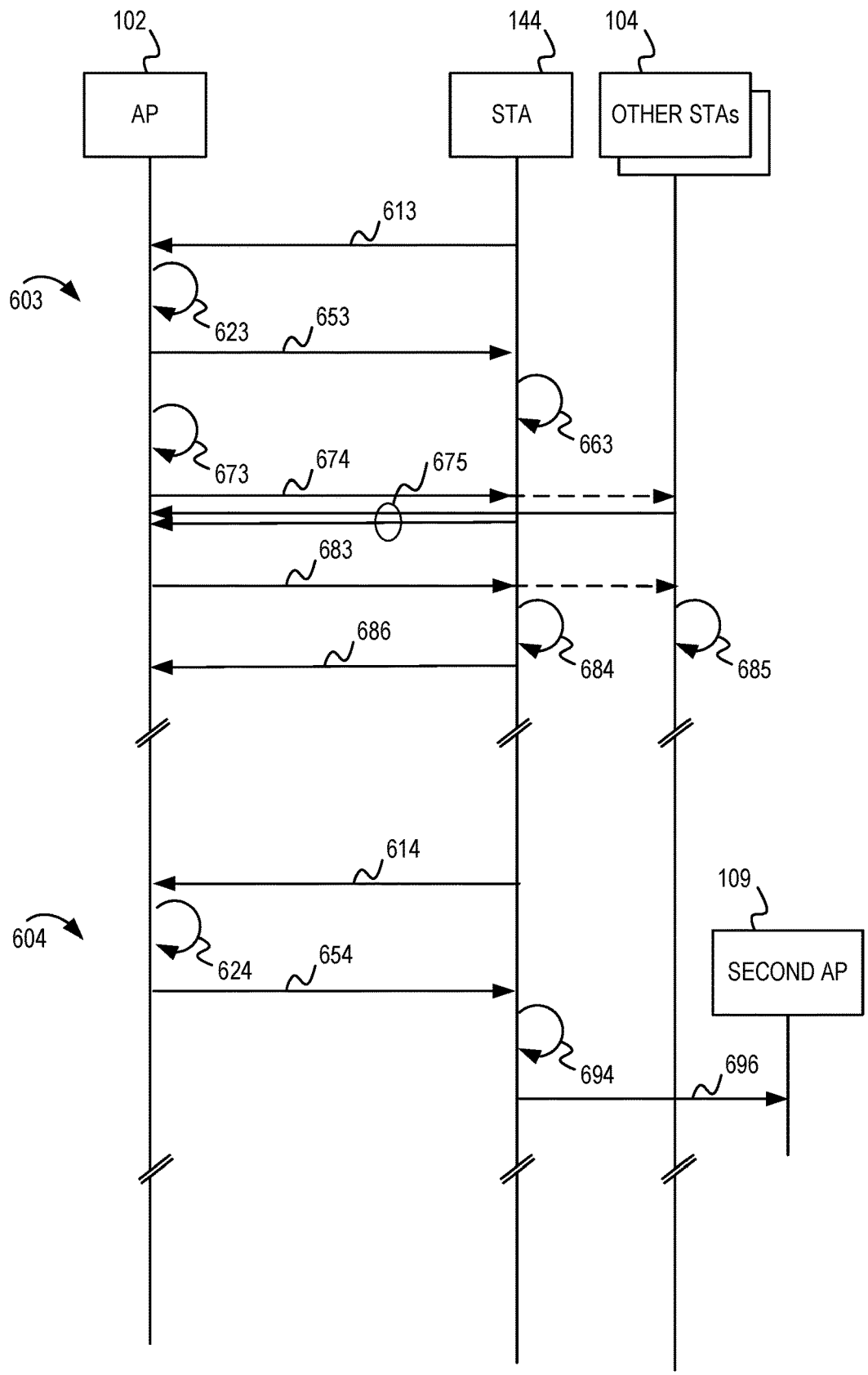
FIG. 6B shows a message flow diagram illustrating different uplink access mode exceptions.

In addition to UL-MU scheduled access mode 601, FIG. 6B shows an example message exchange that may be used in one form of contention-based access 602 (such as the SU access mode, the MU EDCA access mode, or the LL access mode). The example of FIG. 6B is based on the MU EDCA access mode. At a first message 612, the first STA 144 may inform the first AP 102 of the uplink QoS parameters for a data flow from the first STA 144. At process 622, the first AP 102 may determine that the uplink QoS parameters may be satisfied using the MU EDCA access mode. The first AP 102 may transmit a trigger frame 652 (or another configuration frame) which informs the first STA 144 of available contention-based random-access periods. At contention processes 641 and 642, the first STA 144 and one or more other STAs 104 may contend for the available contention-based random-access periods. The first STA 144 may win the contention process and transmit uplink data in uplink communication 672.

In some implementations, the available contention-based access time periods may be pre-configured. For example, beacon messages or other configuration messages may indicate the contention-based access time periods). The contention-based access time periods may be used without a trigger message from the first AP 102. Typically, a non-legacy STA (such as an HE STA or EHT STA) would use either MU EDCA access mode or UL-MU scheduled access mode. However, in accordance with some implementations of this disclosure, the first AP 102 may inform the first STA 144 to use both the UL-MU scheduled access mode and the MU EDCA access mode.

FIG. 6B shows a message flow diagram illustrating different uplink access mode exceptions. For example, FIG. 6B shows an mixed uplink mode 603. For example, a first STA 144 may send a first message 613 that indicates one or more uplink QoS parameters. The first AP 102 may determine (at process 623) to use a combination of UL MU access mode and a contention-based access mode (such as a SU access mode, an MU EDCA access mode, or an LL access mode) to satisfy the uplink QoS parameters. For example, the first AP 102 may provide an exemption to the first STA 144 for a policy that would otherwise require the first STA 144 to use only the UL-MU scheduled access mode. The first AP 102 may transmit a configuration message 653 to inform the first STA 144 that the first STA 144 is permitted to use mixed mode uplink transmissions. At process 663, the first STA 144 may configure its uplink buffer to utilize the mixed mode uplink capability. At process 673, the first AP 102 may determine to send a trigger message 674 to trigger the first STA 144 (and other STAs 104) to send UL-MU scheduled transmissions in respective RUs allocated in the trigger message 674. The first STA 144 (and, optionally, other STAs 104) may use their respective allocated RUs to transmit uplink data via UL MU PPDUs 675. During a contention-based access window, the first AP 102 may send a trigger message 683 that prompts the first STA 144 (and other STAs 104) to use contention-based access for uplink data. At contention processes 684 and 684, the first STA 144 and other STAs 104, respectively, may contend for the available uplink resources. The first STA 144 may win the contention process and sent uplink data in an uplink transmission 686. In some implementations, the use of both UL-MU scheduled access mode and the MU EDCA access mode may satisfy the uplink QoS parameters that may not otherwise be satisfied using just one of these modes.

In another example scenario 604, the first AP 102 may be unable to satisfy the uplink QoS parameters using an existing association with the first STA 144. The first STA 144 may transmit a first message 614 to inform the first AP 102 of the uplink QoS parameter. At process 624, the first AP 102 may determine that it cannot satisfy the uplink QoS parameter. The first AP 102 may transmit a second message 654 to inform the first STA 144 that at least one uplink QoS parameter cannot be satisfied. In some implementations, the second message 654 may inform the first STA 144 of another AP (such as second AP 109) to which the first STA 144 is to associate with. The first STA 144 may transmit an association message 696 to establish a wireless association with the second AP 109. There are several other example scenarios which are possible. For example, the first AP 102 may determine that the first STA 144 will need to use wireless resources from both the first AP 102 and the second AP 109 to satisfy the uplink QoS parameters, and may indicate to the first STA 144 that it is permitted to use both the second AP 109 and the first AP 102 concurrently. In some implementations, the second AP 109 may be a collocated access point that is hosted at the same WLAN apparatus as the first AP 102.

In another example, the first AP 102 may cause the first STA 144 to use a SU access mode rather than a UL-MU scheduled access mode. For example, the first STA 144 may be associated with the first AP 102 using the UL-MU scheduled access mode. The UL-MU access mode may use OFDMA as described in FIG. 4B to allocate different RUs to different STAs. The first AP 102 may determine that it cannot satisfy the uplink QoS parameters requested by the first STA 144 using the allocated RUs, and that the use of MU EDCA access mode (using RA-RUs) will not provide sufficient bandwidth for the first STA 144. As such, the first AP 102 may cause the first STA 144 to switch to the SU access mode. For example, the SU access mode may use the OFDM channel access techniques (using legacy contention-based access) as described in FIG. 4A. In some implementations, to switch to the SU access mode, the first STA 144 is configured to re-associate with the first AP 102. In some implementations, the first STA 144 and the first AP 102 may change an existing wireless association from MU mode to SU mode without performing a full re-association process.

Figure 7:
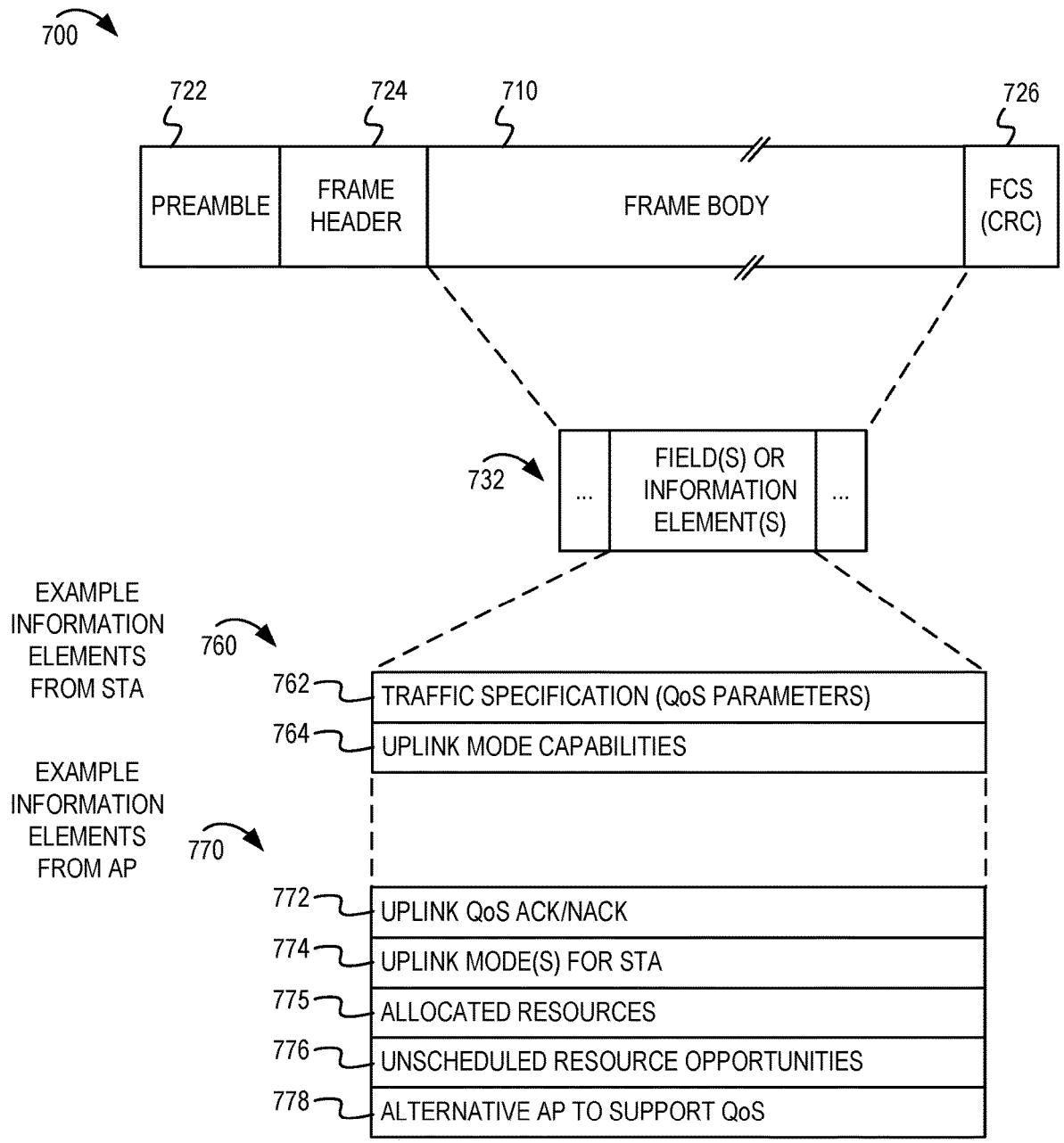
FIG. 7 shows a conceptual diagram of an example message format for communicating QoS uplink access information.

FIG. 7 shows a conceptual diagram of an example format of a message 700 for communicating QoS uplink access information. For example, a first STA 144 may transmit the message 700 to the first AP 102 or the first AP 102 may transmit the message 700 to the first STA 144. The message 700 may include information indicating uplink QoS parameters or uplink access modes. In some implementations, the message 700 is transmitted in the form of a PPDU configured for HE- or EHT-capable devices. The message 700 (which also may be formatted as a PPDU) may include a preamble 722, a frame header 724, a frame body 710, and a frame check sequence (FCS) 726. The preamble 722 may include one or more bits to establish synchronization. The frame header 724 may include source and destination network addresses (such as the network address of the sending AP and receiving AP, respectively), the length of the data frame, or other frame control information. The frame body 710 may include a variety of fields or information elements 732.

Example information elements 732 that a STA (such as the first STA 144) may transmit include a traffic specification 762 or other field that indicates one or more uplink QoS parameters. The information elements 732 transmitted by the first STA 144 may additionally or alternatively indicate uplink mode capabilities 764 supported by the first STA 144. For example, the first STA 144 may indicate whether the first STA 144 supports a mixed uplink mode that includes a combination of UL-MU scheduled access mode and one or more of the MU EDCA access mode, the SU access mode, or the LL access mode in the same session with the first AP 102.

Example information elements 770 that an AP (such as the first AP 102) may transmit include an uplink QoS acknowledgment/negative-acknowledgment (ACK/NACK) 772. The uplink QoS ACK/NACK 772 may indicate whether the first AP 102 accepts the uplink QoS parameter or whether the first AP 102 can satisfy the uplink QoS parameter from the first STA 144. The information elements 732 transmitted by the first AP 102 may additionally or alternatively indicate the uplink mode(s) 774 for the first STA 144 to use. For example, the first AP 102 may determine whether to cause the first STA 144 to use the UL-MU scheduled access mode, the MU EDCA access mode, the SU access mode, the LL access mode, or a combination thereof, and indicate the determined modes in the uplink mode(s) field 774. Furthermore, the first AP 102 may indicate an access category for the first STA 144. In some implementations, the first AP 102 may inform the first STA 144 to use the LL access mode. In some implementations, the message 700 may be a trigger message. The information elements 732 transmitted by the first AP 102 may additionally or alternatively include allocated resources 775 assigned by the first AP 102 for the first STA 144 to use for uplink data. The information elements 732 transmitted by the first AP 102 may additionally or alternatively indicate contention-based access opportunities 776 (such as RA-RUs, or other contention-based access windows) for use with the MU EDCA access mode or the LL access mode. If the first AP 102 cannot satisfy the uplink QoS parameters, the information elements 732 transmitted by the first AP 102 may additionally or alternatively include a field 778 to indicate one or more alternative APs for the first STA 144 to use. For example, the field 778 may indicate a second AP for the first STA 144 to use, as well as an indication of whether the first STA 144 is to use both the first AP 102 and a second AP concurrently, or whether the first STA 144 is to use the second AP as a primary AP for uplink traffic.

Figure 8:
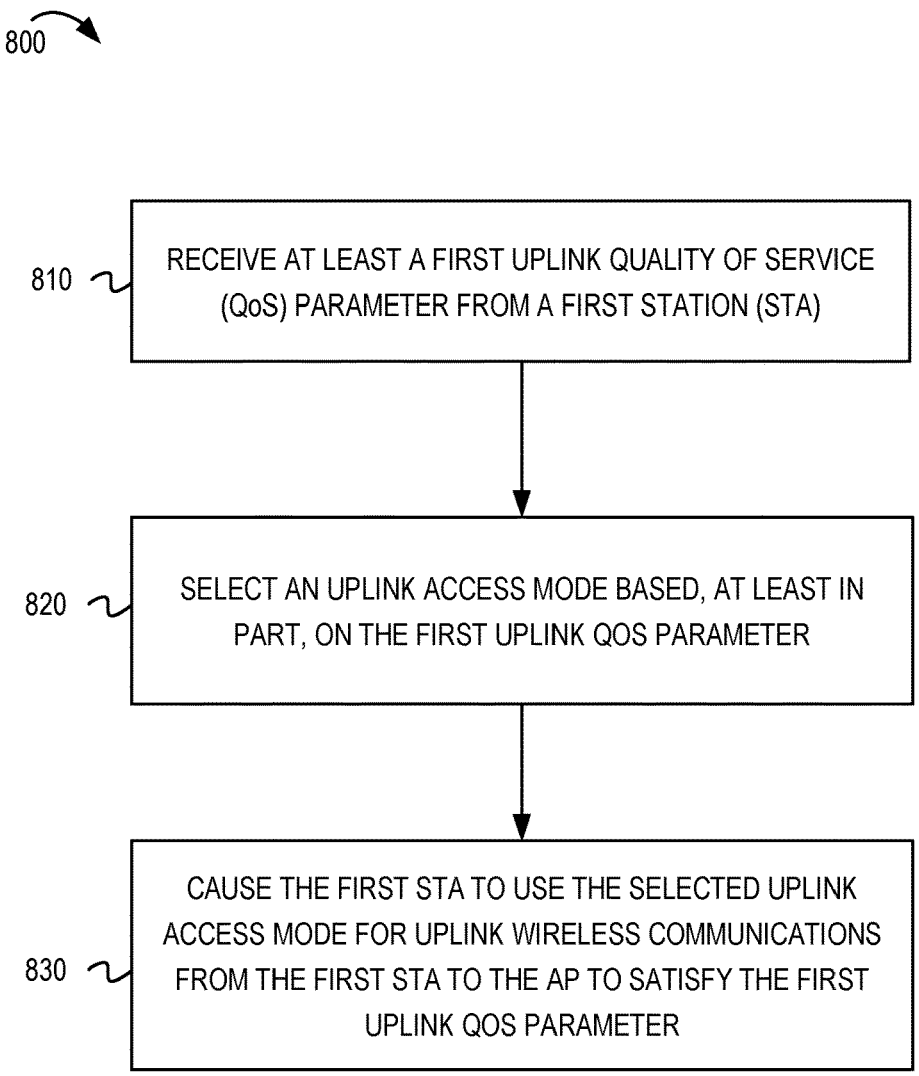
FIG. 8 shows a flowchart illustrating an example process for providing uplink access to support QoS according to some implementations.

FIG. 8 shows a flowchart illustrating an example process 800 for providing uplink access to support QoS according to some implementations. In some implementations, the process 800 may be performed by a wireless communication device such as the first AP 102 described above with reference to FIGS. 1, 6A, 6B, 7, 8 and 10, respectively. In some implementations, the process 800 begins in block 810 with receiving at least a first uplink QoS parameter from a first STA. In block 820, the process 800 proceeds with selecting an uplink access mode based, at least in part, on the first uplink QoS parameter. In block 830, the process 800 proceeds with causing the first STA to use the selected uplink access mode for uplink wireless communications from the first STA to the AP to satisfy the first uplink QoS parameter.

In some implementations, controlling uplink access for uplink wireless communications from the first STA in block 820 may include allocating resources for UL-MU scheduled access mode based on the one or more first uplink QoS parameters. For example, the AP may allocate sufficient RUs to the first STA during a plurality of TXOPs to provide enough uplink transmission opportunities for the STA to transmit uplink data in a manner that satisfies the uplink QoS parameters.

In some implementations, controlling uplink access for uplink wireless communications from the first STA in block 820 may include permitting the STA to use MU EDCA access mode in additional to UL-MU scheduled access mode to satisfy the first uplink QoS parameter. For example, the AP may inform the first STA of the available contention-based access periods. In some implementations, the AP may permit the first STA to use RA-RUs available for multiple STAs in addition to allocated RUs that are dedicated to the first STA.

In some implementations, controlling uplink access for uplink wireless communications from the first STA in block 820 may include redirecting the first STA to another AP. For example, the AP may inform the first STA of a second AP which the first STA can use either concurrently with, or in lieu of, the first AP.

In some implementations, controlling uplink access for uplink wireless communications from the first STA in block 820 may include causing the first STA to use a SU access mode for uplink access. For example, the AP may cause the first STA to discontinue using the UL-MU scheduled access mode and instead use the SU access mode.

In some implementations, controlling uplink access for uplink wireless communications from the first STA in block 820 may include adjusting EDCA parameters or access categories based on the first uplink QoS parameters. For example, the AP may change the access category for the first STA. The AP may provide customized EDCA or access category configurations to the first STA or group of STAs based on particular QoS parameters.

In some implementations, controlling uplink access for uplink wireless communications from the first STA in block 820 may include causing the first STA to use a LL access mode for uplink access. For example, the AP may configure the first STA to use the LL access mode to satisfy the first uplink QoS parameters.

Figure 9:
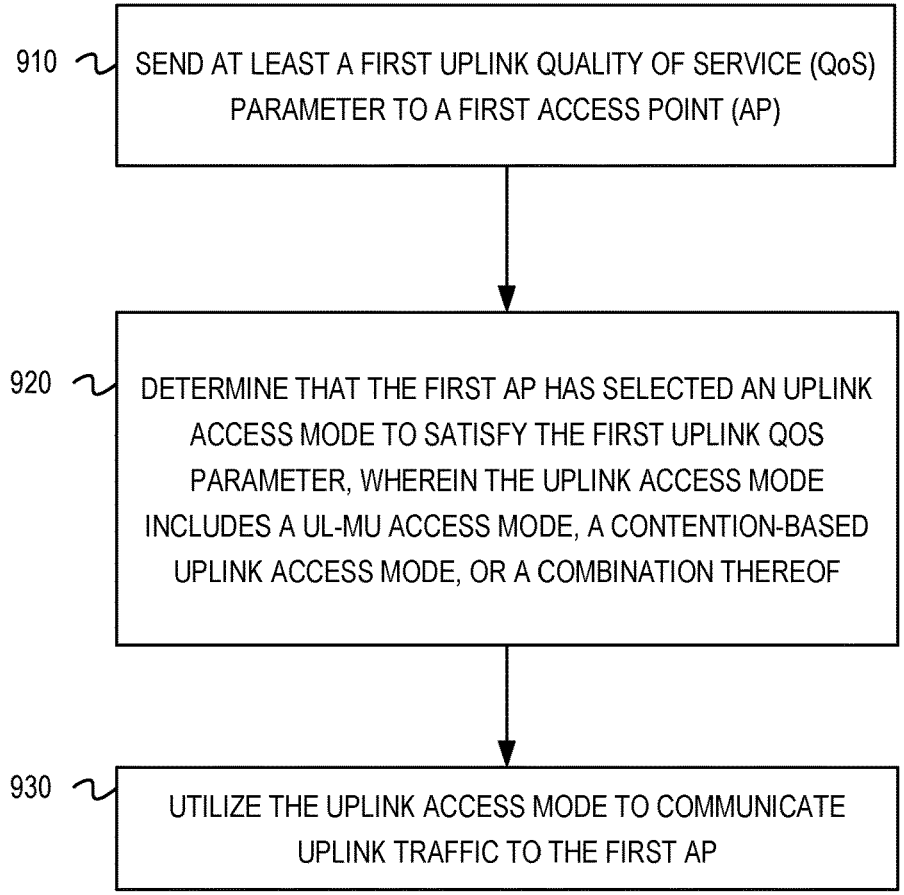
FIG. 9 shows a flowchart illustrating an example process for utilizing uplink access according to some implementations.

FIG. 9 shows a flowchart illustrating an example process 900 for utilizing uplink access according to some implementations. In some implementations, the process 900 may be performed by a wireless communication device such as one of the STAs 144 described above with reference to FIGS. 1, 6A, 6B, 7, 9 and 11, respectively. In some implementations, the process 900 begins in block 910 with sending at least a first uplink QoS parameter to a first AP. In block 920, the process 900 proceeds with determining that the first AP has selected an uplink access mode to satisfy the first uplink QoS parameter. The uplink access mode may include the UL-MU scheduled access mode, the SU access mode, the MU EDCA access mode, the LL access mode, or a combination thereof. In block 930, the process 900 proceeds with utilizing the uplink access mode to communicate uplink traffic to the first AP.

In some implementations, sending the first uplink QoS parameter in block 910 includes sending a TSPEC message from the first STA to the first AP.

In some implementations, utilizing the uplink access mode to communicate uplink traffic to the first AP in block 930 includes receiving a quantity of trigger frames from the first AP over a period of time, such that the quantity of trigger frames allocates enough resources for respective uplink transmissions to satisfy the first uplink QoS parameter. In some implementations, utilizing the uplink access mode to communicate the uplink traffic to the first AP in block 930 includes utilizing a combination of uplink modes. For example, the process 900 may include utilizing the UL-MU scheduled access mode for a first portion of the uplink traffic, and utilizing the another access mode (such as MU EDCA access mode) for a second portion of the uplink traffic.

Figure 10:
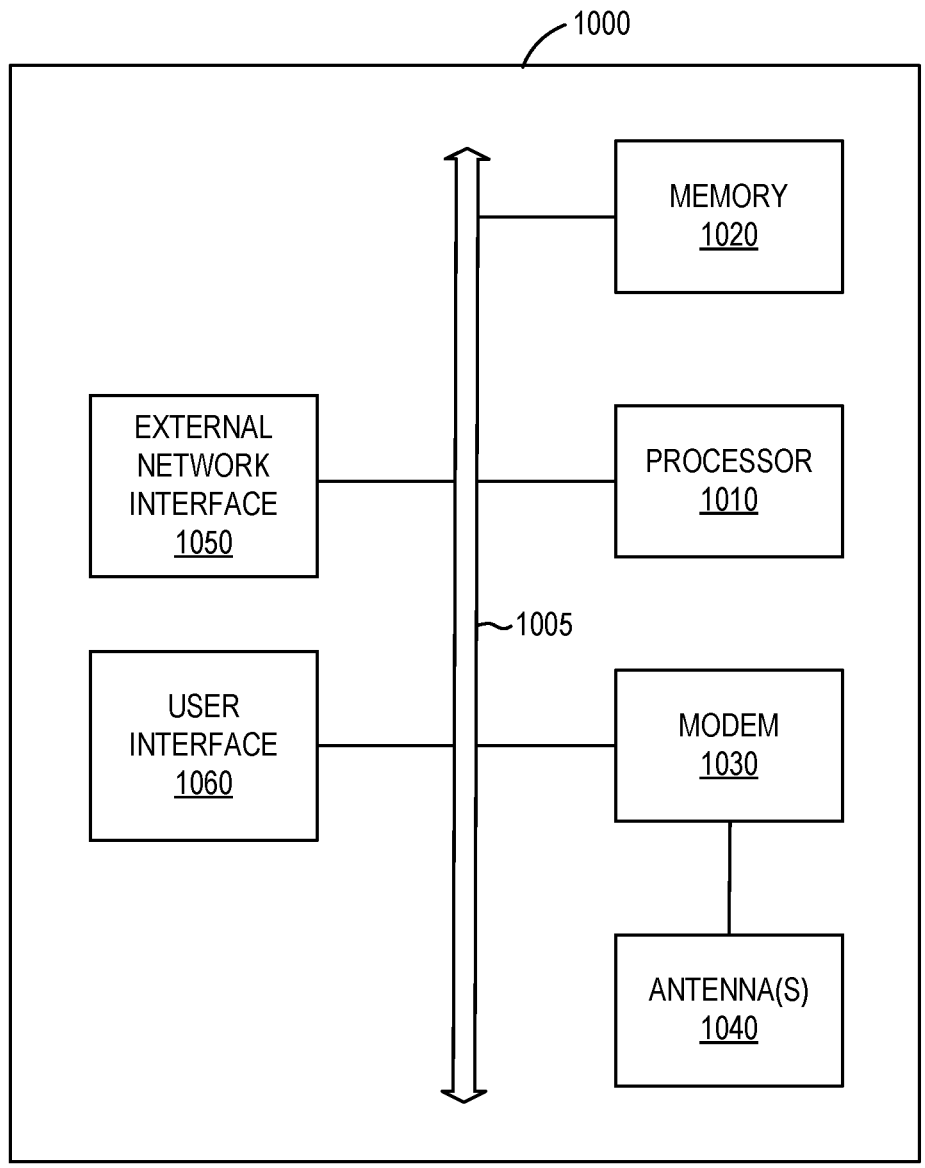
FIG. 10 shows a block diagram of an example access point (AP) according to some implementations.

FIG. 10 shows a block diagram of an example AP 1000 according to some implementations. For example, the AP 1000 may be an example of aspects of the first AP 102 described with reference to FIG. 1. The AP 1000 is capable of transmitting and receiving wireless communications (for example, in the form of wireless packets), as well as of encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11ay, 802.11ax, 11be, 11bd, 802.11az, and 802.11ba). The AP 1000 includes at least one processor 1010 (collectively "the processor 1010"), at least one memory 1020 (collectively "the memory 1020"), at least one modem 1030 (collectively "the modem 1030"), at least one antenna 1040 (collectively "the antenna 1040"), at least one external network interface 1050 (collectively "the network interface 1050") and, in some instances, a user interface (UI) 1060. Each of the components (or "modules") described with reference to FIG. 10 can communicate with other ones of the components, directly or indirectly, over at least one bus 1005. Although illustrated as being coupled to the bus 1005, the memory 1020 may be coupled to the processor 1010.

The processor 1010 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 1010 processes information received through the modem 1030 and the external network interface 1030. The processor 1010 also can process information to be sent to the modem 1030 for transmission through the antenna 1040 and information to be sent to the external network interface 1030. The processor 1010 can generally be configured to perform various operations related to generating and transmitting a downlink frame and receiving an uplink frame.

The memory 1020 can include random access memory (RAM) and read-only memory (ROM). The memory 1020 also can store processor- or computer-executable software (SW) code containing instructions that, when executed by the processor 1010, cause the processor to perform various functions described herein for wireless communication, including generation and transmission of a downlink frame and reception of an uplink frame.

The modem 1030 is generally configured to modulate packets and to provide the modulated packets to the antenna 1040 for transmission, as well as to demodulate packets received from the antenna 1040 to provide demodulated packets. The modem 1030 generally includes or is coupled with at least one radio frequency (RF) transmitter and at least one RF receiver, which may be combined into one or more transceivers, and which are in turn coupled to one or more antennas 1040. For example, in some AP implementations, the AP 1000 can include multiple transmit antennas (each with a corresponding transmit chain) and multiple receive antennas (each with a corresponding receive chain). The modem 1030 can communicate bi-directionally, via the antenna 1040, with at least one wireless device (such as the STA 104 or the wireless device 144 described with reference to FIG. 1).

The modem 1030 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 1010 for processing, evaluation or interpretation, for example, by one or more host applications executing on the processor.

The AP 1000 may communicate with a core or backhaul network through the external network interface 1050 to gain access to external networks including the Internet. For example, the external network interface 1050 may include one or both of a wired (for example, Ethernet) network interface or wireless (for example, LTE, 4G or 5G) network interface.

The AP 1000 may include an uplink access control unit as described in FIG. 1. The uplink access control unit may implement any of the uplink QoS management techniques described in this disclosure. In some implementations, the uplink access control unit 120 may be implemented at least in part by the processor 1010. For example, the memory 1020 can be coupled with the processor 1010 via a bus 1005 and store include computer instructions executable by the processor 1010 to implement the functionality of the uplink access control unit 120. Generally, some or all of the functionalities performed by the uplink access control unit may be partially (or entirely) implemented in software or hardware.

Figure 11:
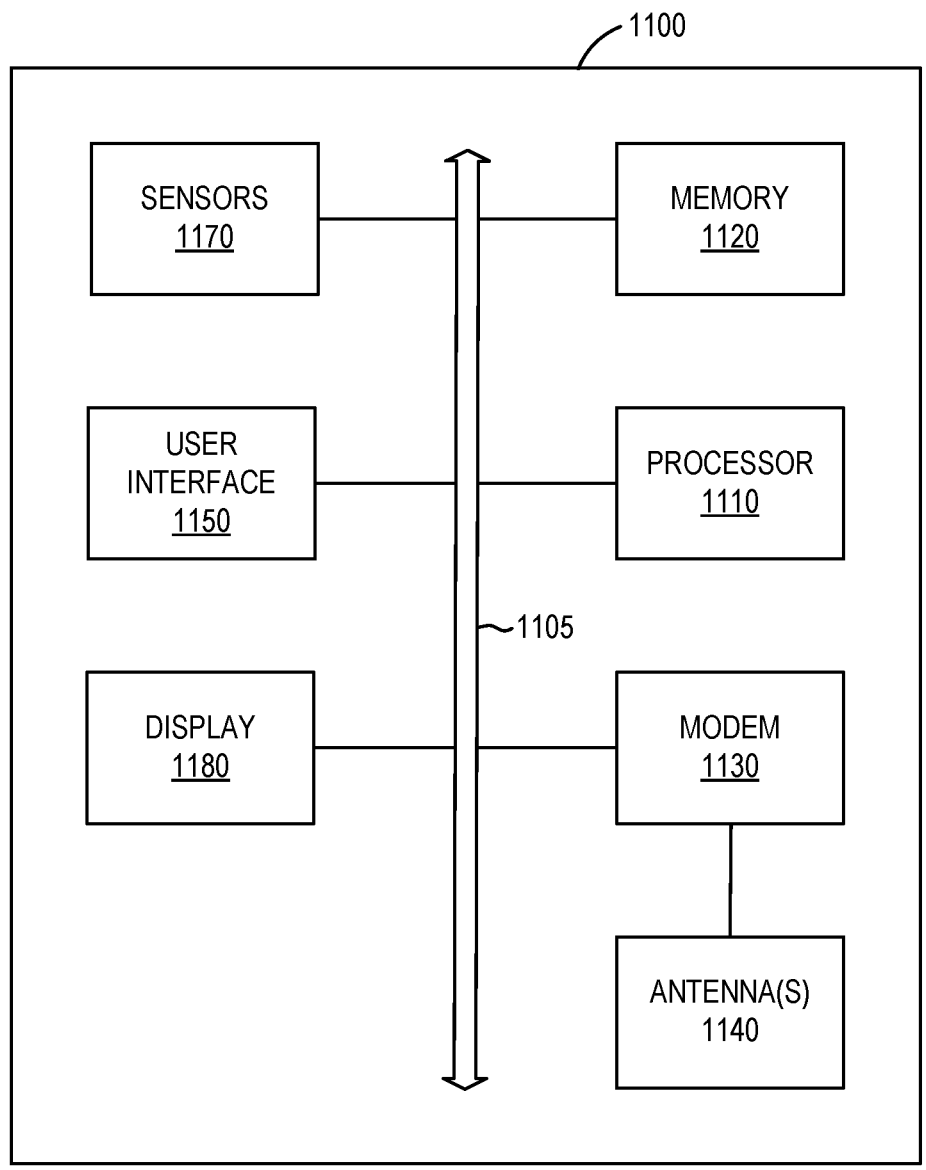
FIG. 11 shows a block diagram of an example station (STA) according to some implementations.

FIG. 11 shows a block diagram of an example STA 1100 according to some implementations. For example, the wireless device 1100 may be an example of aspects of the wireless device 144 described with reference to FIG. 1. The wireless device 1100 is capable of transmitting and receiving wireless communications, as well as of encoding and decoding such communications. The wireless communications may conform to any of a number of different wireless communication protocols. For example, the wireless device 1100 may be capable of transmitting and receiving Wi-Fi packets including frames conforming to an IEEE 802.11 standard, such as defined by the IEEE 802.11-2016 specification or amendments thereof including, but not limited to, 802.11ah, 802.11ay, 802.11ax, 802.11az, and 802.11ba). Additionally, or alternatively, the wireless device 1100 may be capable of transmitting and receiving Bluetooth packets conforming to a Bluetooth standard, such as defined in IEEE 802.15 or by the Bluetooth SIG. Additionally, or alternatively, the wireless device 1100 may be capable of transmitting and receiving wireless packets associated with the Long Term Evolution (LTE), International Mobile Telecommunications-Advanced (IMT-Advanced) 4G or 5G standards.

The wireless device 1100 includes at least one processor 1110 (collectively "the processor 1110"), at least one memory 1120 (collectively "the memory 1120"), at least one modem 1130 (collectively "the modem 1130") and at least one antenna 1140 (collectively "the antenna 1140"). In some implementations, the wireless device 1100 additionally includes some or all of the following: a user interface (UI) 11110 (such as a touchscreen or keypad), one or more sensors 1170 (such as one or more inertial sensors, accelerometers, temperature sensors, pressure sensors, or altitude sensors), and a display 1180. Each of the components (or "modules") described with reference to FIG. 11 can communicate with one another, directly or indirectly, over at least one bus 1105. Although illustrated as being coupled to the bus 1105, the memory 1120 may be coupled to the processor 1110.

The processor 1110 includes an intelligent hardware device such as, for example, a CPU, a microcontroller, an ASIC or a PLD such as an FPGA, among other possibilities. The processor 1110 processes information received through the modem 1130 as well as information to be sent to the modem 1130 for transmission through the antenna 1140. The processor 1110 can be configured to perform various operations related to receiving a downlink frame and generating and transmitting an uplink frame.

The memory 1120 can include RAM and ROM. The memory 1120 also can store processor- or computer-executable SW code containing instructions that, when executed, cause the processor 1110 to perform various functions described herein for wireless communication, including the reception of a downlink frame and generation and transmission of an uplink frame.

The modem 1130 is generally configured to modulate packets and provide the modulated packets to the antenna 1140 for transmission, as well as to demodulate packets received from the antenna 1140 to provide demodulated packets. The modem 1130 generally includes at least one radio frequency (RF) transmitter and at least one RF receiver, which may be combined into one or more transceivers, and which are in turn coupled to one or more antennas 1140. For example, in some implementations, the wireless device 1100 can include multiple transmit antennas (each with a corresponding transmit chain) and multiple receive antennas (each with a corresponding receive chain). The modem 1130 can communicate bi-directionally, via the antenna 1140, with at least one AP (such as the first AP 102 or AP 1000 described with reference to FIGS. 1 and 10, respectively). As is described above, in some implementations, the modem also can communicate bi-directionally, via the antenna 1140, with other STAs directly without the use of an intermediary AP.

The modem 1130 may include digital processing circuitry, automatic gain control (AGC), a demodulator, a decoder, and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 1110 for processing, evaluation or interpretation, for example, by one or more host applications executing on the processor.

The wireless device 1100 may include an uplink transmission unit as described in FIG. 1. The uplink transmission unit 150 may implement any of the service connectivity techniques described in this disclosure. In some implementations, the uplink transmission unit 150 may be implemented by the processor 1110. For example, the memory 1120 can be coupled with the processor 1110 via a bus 1105 and store computer instructions executable by the processor 1110 to implement the functionality of the uplink transmission unit 150. Generally, some or allny of the functionalities performed by the uplink transmission unit may be partially (or entirely) implemented in software or hardware.

Figure 12:
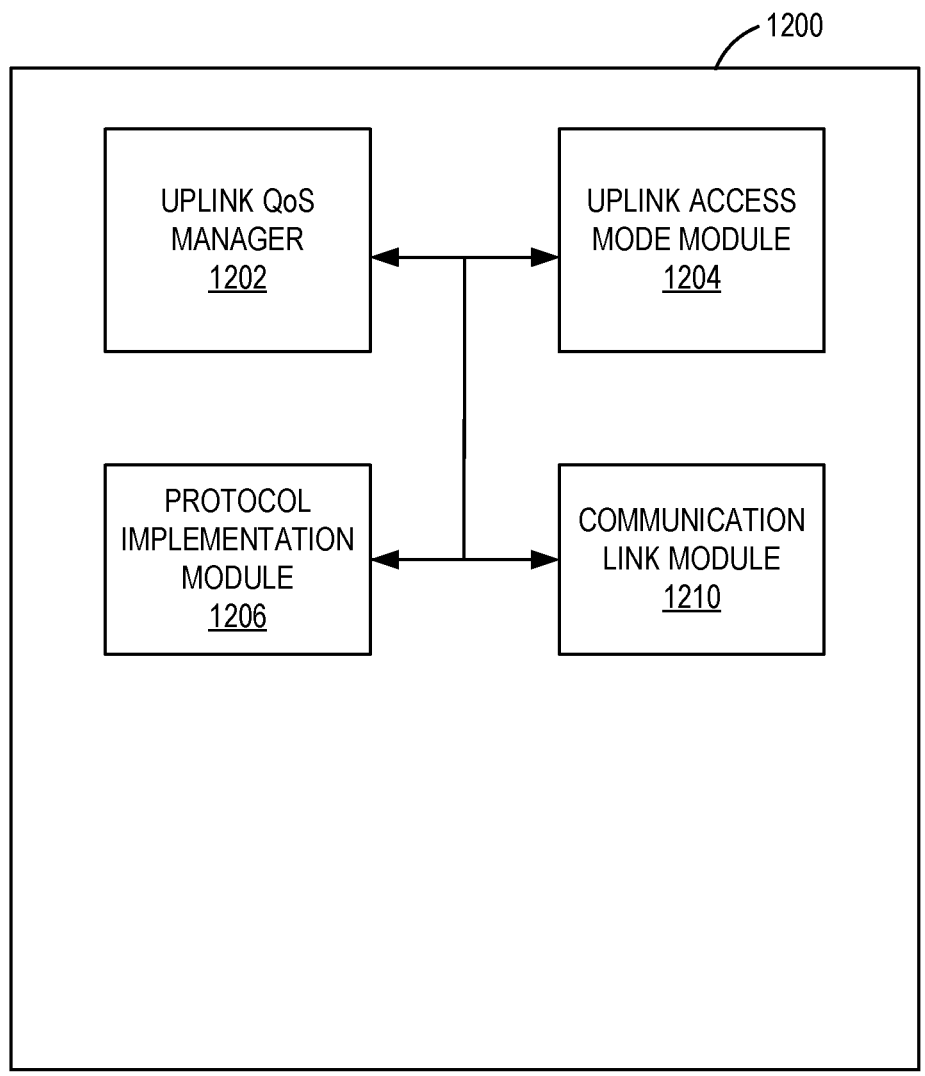
FIG. 12 shows a block diagram of an example wireless communication device for use in wireless communication according to some implementations.

FIG. 12 shows a block diagram of an example wireless communication device 1200 for use in wireless communication according to some implementations. In some implementations, the wireless communication device 1200 can be an example of the first STA 144 or the STA 1100 described above with reference to FIGS. 1, 6A, 6B, 7, and 11, respectively. In some implementations, the wireless communication device 1200 can be an example of the first AP 102 and the AP 1100 described above with reference to FIGS. 1, 6A, 6B, 7, 8 and 10, respectively. In some implementations, the wireless communication device 1200 is configured to perform one or more of the processes 800 and 900 described above with reference to FIGS. 8 and 9, respectively. The wireless communication device 1200 includes an uplink QoS manager 1202, an uplink access mode module 1204, a protocol implementation module 1206, and a communication link module 1210. Portions of one or more of the modules 1202, 1204, 1206 and 1210 may be implemented at least in part in hardware, software or firmware. For example, the uplink access mode module 1204 may be implemented at least in part by one or more modems (for example, a Wi-Fi (IEEE 802.11) modem). In some implementations, at least some of the modules 1202, 1204, 1206 and 1210 are implemented at least in part as software stored in a memory (such as the memory 320 or the memory 420). For example, portions of one or more of the modules 1202, 1204, 1206 and 1210 can be implemented as non-transitory instructions (or "code") executable by at least one processor (such as the processor 1010 or the processor 1110) to perform the functions or operations of the respective module.

The uplink QoS manager 1202 may manage the exchange of uplink QoS parameters from a STA to an AP. For example, the uplink QoS manager 1202 may implement features described at the uplink QoS determination unit 122 or the uplink QoS information unit 152 of FIG. 1. The uplink access mode module 1204 may be used to implement the uplink access modes (as determined by the AP). For example, the uplink access mode module 1204 may implement features described as the uplink access mode determination unit 124 and the mode controller 154 of FIG. 1.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus for wireless communication at a first wireless device of a wireless local area network (WLAN), comprising:
   one or more processors;
   one or more memories coupled with the one or more processors; and
   one or more processor-readable instructions stored in the one or more memories, and
   executable by the one or more processors, individually or collectively, to cause the one or more processors to:
      receive a first message that identifies a traffic flow in a direction from a first station (STA) to the first wireless device, wherein the first message includes a first plurality of quality of service (QoS) parameters associated with the traffic flow;
      transmit a second message, the second message informing the first STA whether the first wireless device accepts the first plurality of QoS parameters associated with the traffic flow; and
      enable communication of frames for the traffic flow from the first STA to the first wireless device according to a periodicity obtained from the first plurality of QoS parameters, wherein enabling the communication of the frames includes transmitting trigger frames or facilitating a schedule for contention-based access.

2. The apparatus of claim 1, wherein the instructions are further executable by the one or more processors, individually or collectively, to cause the one or more processors to:
   select an access mode that supports the traffic flow of the first STA, wherein the access mode includes at least one member selected from a group consisting of a single user (SU) access mode, an uplink multi-user (UL-MU) scheduled access mode, a multi-user enhanced distributed controlled access (MU EDCA) access mode, a low latency (LL) access mode, and combinations thereof.

3. The apparatus of claim 2, wherein, to select the access mode, the instructions are further executable by the one or more processors, individually or collectively, to cause the one or more processors to includes:
   select a contention-based uplink access mode if the UL-MU scheduled access mode cannot satisfy the first plurality of QoS parameters, wherein the contention-based uplink access mode includes one of the SU access mode, the MU EDCA access mode, or the LL access mode; and
   cause the first STA to use the contention-based uplink access mode according to the schedule for contention-based uplink access.

4. The apparatus of claim 3, wherein the instructions are further executable by the one or more processors, individually or collectively, to cause the first wireless device to indicate one or more contention windows in a message to the first STA to cause the first STA to contend for access during the one or more contention windows.

5. The apparatus of claim 4, wherein the instructions are further executable by the one or more processors, individually or collectively, to cause the one or more processors to modify a quantity of the one or more contention windows to be indicated to the first STA such that the quantity of the one or more contention windows is sufficient to satisfy the first plurality of QoS parameters.

6. The apparatus of claim 3, wherein the instructions are further executable by the one or more processors, individually or collectively, to cause the one or more processors to:
select a contention parameter for a LL access category of the LL access mode, wherein the contention parameter is associated with the first plurality of QoS parameters; and
transmit an indication to the first STA to cause the first STA to use the LL access category of the LL access mode.

7. The apparatus of claim 2, wherein to select the access mode, the instructions are further executable by the one or more processors, individually or collectively, to cause the one or more processors to:
select the combination of the UL-MU scheduled access mode and MU EDCA access mode;
allocate resources of the UL-MU scheduled access mode for a first portion of the access for the first STA; and
cause the first STA to use the MU EDCA access mode for a second portion of the access.

8. The apparatus of claim 1, wherein the first STA is configured to use a multi-user (MU) association for use with an uplink multi-user (UL-MU) scheduled access mode, and wherein the instructions are further executable by the one or more processors, individually or collectively, to cause the one or more processors to:
select a single-user (SU) access mode if the UL-MU scheduled access mode cannot satisfy the first plurality of QoS parameters and the SU access mode can satisfy the first plurality of QoS parameters; and
cause the first STA to use a SU association for use with the SU access mode for the access.

9. The apparatus of claim 1, wherein the instructions are further executable by the one or more processors, individually or collectively, to cause the one or more processors to:
inform the first STA via the second message regarding one or more QoS parameters of the first plurality of QoS parameters that the first wireless device cannot satisfy.

10. The apparatus of claim 1, wherein the instructions are further executable by the one or more processors, individually or collectively, to cause the one or more processors to cause the first STA to associate with a second wireless device that can satisfy the first plurality of QoS parameters when the first wireless device does not accept the first plurality of QoS parameters.

11. The apparatus of claim 10, wherein the second wireless device is collocated with the first wireless device, and wherein the second wireless device and the first wireless device utilize different frequency bands.

12. The apparatus of claim 1, wherein the instructions are further executable by the one or more processors, individually or collectively, to cause the one or more processors to:
cause a second wireless device or a second STA to reduce interference on a first wireless channel used by the first wireless device to enable the first wireless device to satisfy the first plurality of QoS parameters.

13. The apparatus of claim 1, wherein the first plurality of QoS parameters indicates at least one member selected from a group consisting of:
requested minimum throughput, requested maximum latency, and
requested maximum jitter.

14. The apparatus of claim 1, wherein the instructions are further executable by the one or more processors, individually or collectively, to cause the one or more processors to:
receive at least a second plurality of QoS parameters; and
distribute available access resources between the first STA and a second STA based, at least in part, on the first plurality of QoS parameters and the second plurality of QoS parameters.

15. The apparatus of claim 1, wherein the first wireless device is a first access point (AP).

16. The apparatus of claim 1, wherein the first wireless device is a second STA.

17. The apparatus of claim 1, wherein the instructions are further executable by the one or more processors, individually or collectively, to cause the one or more processors to enable the communication of the frames when the first wireless device accepts the first plurality of QoS parameters for the traffic flow.

18. An apparatus for wireless communication at a first station (STA) of a wireless local area network (WLAN) comprising:
one or more processors;
one or more memories coupled with the one or more processors; and
one or more processor-readable instructions stored in the one or more memories, and
executable by the one or more processors, individually or collectively, to cause the one or more processors to:
transmit a first message that identifies traffic flow in a direction from the first STA to a first wireless device, wherein the first message includes a plurality of quality of service (QoS) parameters associated with the traffic flow;
receive a second message that indicates whether the first wireless device accepts the plurality of QoS parameters for the traffic flow; and
communicate frames for the traffic flow from the first STA to the first wireless device according to a periodicity obtained from the plurality of QoS parameters, wherein the frames are communicated in association with trigger frames received from the first wireless device or according to a schedule for contention-based access.

19. The apparatus of claim 18, wherein the first STA is associated with the first wireless device using a multi-user (MU) association for use with an uplink multi-user (UL-MU) scheduled access mode, and wherein the instructions are further executable by the one or more processors, individually or collectively, to cause the one or more processors to:
establish a wireless association with the first wireless device using a single-user (SU) association for use with a SU access mode if the UL-MU scheduled access mode cannot satisfy the plurality of QoS parameters and the SU access mode can satisfy the plurality of QoS parameters.

20. The apparatus of claim 18, wherein the instructions are further executable by the one or more processors, individually or collectively, to cause the one or more processors to:
utilize a first access mode for a first portion of the traffic flow, wherein the first access mode is an uplink multi-user (UL-MU) scheduled access mode; and
utilize a second access mode for a second portion of the traffic flow, wherein the second access mode is a contention-based access mode.

21. The apparatus of claim 18, wherein the instructions are further executable by the one or more processors, individually or collectively, to cause the one or more processors to:
  receive, via the second message from the first wireless device, information regarding one or more QoS parameters of the plurality of QoS parameters that the first wireless device cannot satisfy.

22. The apparatus of claim 18, wherein the first wireless device is a first access point (AP).

23. The apparatus of claim 18, wherein the first wireless device is a second STA.

24. The apparatus of claim 18, wherein the instructions are further executable by the one or more processors, individually or collectively, to cause the one or more processors to communicate the frames when the first wireless device accepts the plurality of QoS parameters for the traffic flow.

25. A method for wireless communication by a wireless communication device for use in a first wireless device of a wireless local area network (WLAN), comprising:
  receiving a first message that identifies a traffic flow in a direction from a first STA to the first wireless device, wherein the first message includes a plurality of quality of service (QoS) parameters associated with the traffic flow;
  transmitting a second message for transmission, the second message informing the first STA whether the first wireless device accepts the plurality of QoS parameters associated with the traffic flow; and
  enabling communication of frames for the traffic flow from the first STA to the first wireless device according to a periodicity obtained from the plurality of QoS parameters, wherein the enabling the communication of the frames includes transmitting trigger frames or facilitating a schedule for contention-based access.

26. The method of claim 25, wherein the first wireless device is a first access point (AP) or a second STA.

27. The method of claim 25, wherein enabling the communication of the frames occurs when the first wireless device accepts the first plurality of QoS parameters for the traffic flow.

28. A method for wireless communication by a wireless communication device for use in a mobile station of a wireless local area network (WLAN) comprising:
  transmitting a first message that identifies a traffic flow of the mobile station and includes a plurality of quality of service (QoS) parameters associated with the traffic flow;
  receiving a second message that indicates whether the first wireless device accepts the plurality of QoS parameters for the traffic flow; and
  communicating frames for the traffic flow from the mobile station to the first wireless device according to a periodicity obtained from the plurality of QoS parameters, wherein the frames are communicated in association with trigger frames received from the first wireless device or according to a schedule for contention-based access.

29. The method of claim 28, further comprising:
  receiving information regarding one or more QoS parameters that the first wireless device cannot satisfy.

30. The method of claim 28, wherein the first wireless device is a first access point (AP) or a second mobile station.

\* \* \* \* \*